United States Patent
Fujita et al.

(10) Patent No.: US 10,024,611 B2
(45) Date of Patent: Jul. 17, 2018

(54) ALUMINUM ALLOY MATERIAL FOR HEAT EXCHANGER FIN, MANUFACTURING METHOD FOR SAME, AND HEAT EXCHANGER USING THE ALUMINUM ALLOY MATERIAL

(71) Applicant: UACJ CORPORATION, Chiyoda-Ku, Tokyo (JP)

(72) Inventors: Kazuko Fujita, Tokyo (JP); Akio Niikura, Tokyo (JP); Takashi Murase, Tokyo (JP)

(73) Assignee: UACJ Corporation, Tokyo (JP)

( * ) Notice: Subject to any disclaimer, the term of this patent is extended or adjusted under 35 U.S.C. 154(b) by 730 days.

(21) Appl. No.: 14/374,557

(22) PCT Filed: Jan. 25, 2013

(86) PCT No.: PCT/JP2013/051664
§ 371 (c)(1),
(2) Date: Jul. 25, 2014

(87) PCT Pub. No.: WO2013/111884
PCT Pub. Date: Aug. 1, 2013

(65) Prior Publication Data
US 2014/0360712 A1  Dec. 11, 2014

(30) Foreign Application Priority Data
Jan. 27, 2012 (JP) .................. 2012-014939

(51) Int. Cl.
*B32B 15/01* (2006.01)
*F28F 21/08* (2006.01)
(Continued)

(52) U.S. Cl.
CPC ............ *F28F 21/084* (2013.01); *B22D 25/02* (2013.01); *B23K 1/0012* (2013.01);
(Continued)

(58) Field of Classification Search
None
See application file for complete search history.

(56) References Cited

U.S. PATENT DOCUMENTS

2005/0155676 A1* 7/2005 Cosse .................. C22C 21/04
148/415
2007/0062618 A1   3/2007 Zhao et al.

FOREIGN PATENT DOCUMENTS

JP     03-006355 A      1/1991
JP     H07109537    *  4/1995
(Continued)

OTHER PUBLICATIONS

European Search Report dated Dec. 17, 2015 corresponding to European Application No. EP13740923.1.
(Continued)

*Primary Examiner* — Daniel J. Schleis
(74) *Attorney, Agent, or Firm* — Carrier Blackman & Associates, P.C.; Joseph P. Carrier; Anne G. Sabourin

(57) ABSTRACT

Disclosed is an aluminum alloy material for a heat exchanger fin, the aluminum alloy material containing Si: 1.0% to 5.0% by mass, Fe: 0.1% to 2.0% by mass, and Mn: 0.1% to 2.0% by mass with balance being Al and inevitable impurities, wherein 250 pieces/mm$^2$ or more to 7×104 pieces/mm$^2$ or less of Si-based intermetallic compound particles having equivalent circle diameters of 0.5 to 5 µm are present in a cross-section of the aluminum alloy material; and wherein 10 pieces/mm$^2$ or more and 1000 pieces/mm$^2$ or less of the Al—Fe—Mn—Si-based intermetallic compounds having equivalent circle diameters of more than 5 µm are present in a cross-section of the aluminum alloy material. The aluminum alloy material may further contain one or more additive elements of Mg, Cu, Zn, In, Sn, Ti, V, Zr, Cr, Ni, Be, Sr, Bi, Na, and Ca.

12 Claims, 3 Drawing Sheets

(51) Int. Cl.
  *C22F 1/00* (2006.01)
  *C22F 1/043* (2006.01)
  *C22F 1/047* (2006.01)
  *C22F 1/053* (2006.01)
  *B23K 35/28* (2006.01)
  *B23K 35/00* (2006.01)
  *B23K 35/02* (2006.01)
  *C22C 21/02* (2006.01)
  *C22C 21/04* (2006.01)
  *C22C 21/10* (2006.01)
  *B23K 1/00* (2006.01)
  *B22D 25/02* (2006.01)
  *C22C 21/08* (2006.01)
  *F28F 1/12* (2006.01)

(52) U.S. Cl.
  CPC ........ *B23K 35/002* (2013.01); *B23K 35/0227* (2013.01); *B23K 35/0244* (2013.01); *B23K 35/286* (2013.01); *C22C 21/02* (2013.01); *C22C 21/04* (2013.01); *C22C 21/08* (2013.01); *C22C 21/10* (2013.01); *C22F 1/00* (2013.01); *C22F 1/043* (2013.01); *C22F 1/047* (2013.01); *C22F 1/053* (2013.01); *F28F 1/126* (2013.01)

(56) References Cited

FOREIGN PATENT DOCUMENTS

| | | | |
|---|---|---|---|
| JP | 2001-262264 A | | 9/2001 |
| JP | 2004-332106 A | | 11/2004 |
| JP | 2005139505 | * | 6/2005 |
| JP | 2005139505 A | | 6/2005 |
| JP | 2008-303405 A | | 12/2008 |
| JP | 2008-308760 A | | 12/2008 |
| JP | 2009-068056 A | | 4/2009 |
| JP | 2009-161835 A | | 7/2009 |
| JP | 2010-168613 A | | 8/2010 |
| JP | 2012-040611 A | | 3/2012 |
| JP | 2012-051028 A | | 3/2012 |

OTHER PUBLICATIONS

"Aluminum Brazing Handbook (revised edition)", Japan Light MetalWelding & Construction Association, 2003—*as discussed in the specification.

* cited by examiner

ALUMINUM ALLOY MATERIAL FOR HEAT EXCHANGER FIN, MANUFACTURING METHOD FOR SAME, AND HEAT EXCHANGER USING THE ALUMINUM ALLOY MATERIAL

TECHNICAL FIELD

The present invention relates to an aluminum alloy material used as a material for a heat exchanger fin and a manufacturing method for the same, and more particularly to an aluminum alloy material capable of being bonded to another member with its own bonding function without using a brazing filler metal, and to a manufacturing method for the said aluminum alloy material. The present invention further relates to a heat exchanger, which employs the said aluminum alloy material, and which can be manufactured efficiently.

BACKGROUND ART

When manufacturing a structural body, such as a heat exchanger, which employs an aluminum alloy material as a constituent member, it is required to bond the aluminum alloy materials to each other or to bond the aluminum alloy material to another different type of material. Various methods are known as bonding methods for the aluminum alloy material. Among the various methods, a brazing method (hard soldering method) is used in many cases. The brazing method is often used in consideration of, e.g., an advantage that strong bonding can be obtained in a short time without melting a base material. As methods for manufacturing a heat exchanger, etc. by employing methods of bonding the aluminum alloy material with the brazing, there are known, for example, a method of using a brazing sheet on which a brazing filler metal made of an Al—Si alloy is clad, a method of using an extruded member coated with a powdery brazing filler metal, and a method of assembling various members and then additionally applying a brazing filler metal to portions that are to be bonded (Patent Documents 1 to 3). Moreover, "Chapter 3.2 Brazing Alloys and Brazing Sheets" in Non-Patent Document 1 explains the clad brazing sheet and the powdery brazing filler metal in detail.

Up to date, various brazing methods have been developed in the field of manufacturing of a structural body using an aluminum alloy material. In relation to vehicular heat exchangers, for example, when a fin member is used in a single layer, there have been utilized a method of using a brazing sheet made of a tube material sheet on which a brazing filler metal is clad, and a method of additionally coating Si powder or a Si-containing brazing metal over the tube material sheet. On the other hand, when the tube member is used in a single layer, there has been utilized a method of using a brazing sheet made of a fin material sheet on which a brazing filler metal is clad.

Patent Document 4 discloses a method of employing a single-layer brazing sheet instead of the above-mentioned clad brazing sheet. That method proposes the use of the single-layer brazing sheet for a heat exchanger as a fin member and a tank member of the heat exchanger. According to Patent Document 4, a desired shape is held by adjusting an amount of Si to be added and a brazing temperature. In the fin member that is thinner than the tube member and/or the tank member, however, the disclosed method is not satisfactory as a method for maintaining the desired shape while ensuring sufficient brazing performance.

PRIOR ART DOCUMENTS

Patent Documents

Patent Document 1: JP 2008-303405 A
Patent Document 2: JP 2009-161835 A
Patent Document 3: JP 2008-308760 A
Patent Document 4: JP 2010-168613 A Non-Patent Document Non-Patent Document 1: "Aluminum Brazing Handbook (revised edition)", Japan Light Metal Welding & Construction Association, 2003

SUMMARY OF THE INVENTION

Problems to be Solved by the Invention

Manufacturing a clad sheet, such as a brazing sheet, requires steps of manufacturing individual layers separately, and bonding the individual layers to each other after laying them in a layered state. Thus, the use of the brazing sheet is contradictory to a demand for production cost reduction of the heat exchanger, etc. Coating the powdery brazing filler metal also increases the production cost corresponding to the cost of the brazing filler metal.

Meanwhile, there is a proposed as described above to employ the single-layer brazing sheet instead of the brazing clad sheet. However, when the single-layer brazing sheet is used as a fin member having a small thickness, there arises a problem that a fin is easily susceptible to buckling deformation during brazing even under a small load. Moreover, in the case of trying to increase the amount of Si in the composition and/or the brazing temperature for ensuring the brazing performance, the fin is more susceptible to deformation. It is hence very difficult to properly control both of the brazing performance and the degree of deformation during the brazing operation.

Thus, it can be said that it would be preferable to bond single-layer materials to each other without using the brazing filler metal from the viewpoint of reducing the cost of the aluminum alloy structural body such as the heat exchanger. However, if the single-layer brazing sheet is simply employed, it would be difficult to avoid the problem of deformation of component members. The present invention has been made in view of the background described above, and an object of the present invention is to provide an aluminum alloy material, which is used as a material for a heat-exchanger fin, and which does not cause the problem of deformation during bonding while avoiding a cost increase attributable to the use of a multilayered-member.

Means for Solving the Problems

As a result of conducting intensive studies, the inventors have found a novel bonding method, which improves the method of bonding an aluminum alloy material with the known brazing method, and which utilizes a bonding ability exerted by a material itself to be bonded without using a brazing filler metal. The novel bonding method is featured in that members are bonded and assembled under particular conditions by employing a later-described aluminum alloy material for a heat exchanger fin, that the members can be bonded to each other under heating without using a bonding auxiliary material such as a brazing filler metal (that capability is called a "heat bonding function"), and that deformation between before and after the bonding can be held very small.

According to a first aspect, the present invention provides an aluminum alloy material for a heat exchanger fin, the aluminum alloy material having a superior bonding function under heating of a single layer of the aluminum alloy material and containing Si: 1.0% by mass to 5.0% by mass, Fe: 0.1% by mass to 2.0% by mass, and Mn: 0.1% by mass to 2.0% by mass with balance being Al and inevitable impurities, wherein 250 pieces/mm$^2$ or more to $7 \times 10^4$ pieces/mm$^2$ or less of Si-based intermetallic compound particles having equivalent circle diameters of 0.5 to 5 μm are present in a cross-section of the aluminum alloy material, while 10 pieces/mm$^2$ or more and 1000 pieces/mm$^2$ or less of Al—Fe—Mn—Si-based intermetallic compound particles having equivalent circle diameters of 5 μm or more are present in a cross-section of the aluminum alloy material According to a second aspect of the present invention, in the above-described first aspect, the aluminum alloy material satisfies T/To≤1.40 where T denotes tensile strength of a material plate, and To denotes tensile strength after heating at 450° C. for 2 hours.

According to a third aspect of the present invention, in the above-described first or second aspect, the aluminum alloy material further contains one or two selected from Mg: 2.0% by mass or less and Cu: 1.5% by mass or less.

According to a fourth aspect of the present invention, in any one of the above-described first to third aspects, the aluminum alloy material further contains one or two or more selected from among Zn: 6.0% by mass or less, In: 0.3% by mass or less, and Sn: 0.3% by mass or less.

According to a fifth aspect of the present invention, in any one of the above-described first to fourth aspects, the aluminum alloy material further contains one or two or more selected from among Ti: 0.3% by mass or less, V: 0.3% by mass or less, Zr: 0.3% by mass or less, Cr: 0.3% by mass or less, and Ni: 2.0% by mass or less.

According to a sixth aspect of the present invention, in any one of the above-described first to fifth aspects, the aluminum alloy material further contains one or two or more selected from among Be: 0.1% by mass or less, Sr: 0.1% by mass or less, Bi: 0.1% by mass or less, Na: 0.1% by mass or less, and Ca: 0.05% by mass or less.

According to a seventh aspect of the present invention, in any one of the above-described first to sixth aspects, tensile strength before heating for bonding is 80 to 250 MPa.

According to an eighth aspect, the present invention provides a method of manufacturing the aluminum alloy material for the heat exchanger fin according to any one of the above-described first to seventh aspects, the method comprising steps of: casting an aluminum alloy for the aluminum alloy material, heating a cast ingot before hot rolling, hot-rolling the ingot after the heating step, cold-rolling a hot-rolled plate, and annealing a cold-rolled plate midway the cold rolling step, wherein a casting speed is set to be 20 to 100 mm/min in the casting step, and wherein the hot rolling step includes a rough rolling stage in which a total rolling reduction ratio is set to be 92 to 97%, the rough rolling stage including three or more passes in each of which the rolling reduction ratio is 15% or more.

According to a ninth aspect, the present invention provides a heat exchanger manufactured by heating and bonding a fin member which is made of the aluminum alloy material according to any one of the above-described first to seventh aspects, and another constituent member of the heat exchanger together.

According to a tenth aspect of the present invention, in the above-described ninth aspect, a grain size of an aluminum matrix in a microstructure in a cross-section of the aluminum alloy material of the fin member after heating for bonding is 50 μm or more.

According to an eleventh aspect of the present invention, in the above-described ninth or tenth aspect, when observed the microstructure in the cross-section of the aluminum alloy material of the fin member after the heating for the bonding, the number of triple points of grain boundaries where intermetallic compound particles having equivalent circle diameters of 1 μm or more exist, is 50% or more of the total number of triple points of all the grain boundaries.

According to a twelfth aspect of the present invention, in any one of the above-described ninth to eleventh aspects, when observed the microstructure in the fin cross-section of the aluminum alloy material of the fin member after the heating for the bonding, 10 pieces/mm$^2$ to 3000 pieces/mm$^2$ of eutectic structures having lengths of 3 μm or more are present within matrix grains.

The present invention will be described in detail below. The present invention is basically featured in that a liquid phase generated when heating the aluminum alloy material having the above-mentioned composition is utilized for bonding. In view of such a basic feature, the mechanism in generation of that liquid phase is first described.

FIG. 1 illustrates a phase diagram of an Al—Si-based alloy that is a typical binary-phase eutectic alloy. When an aluminum alloy material having a Si composition of c1 is heated, a liquid phase starts to generate at a temperature T1 near but in excess of a eutectic temperature (solidus temperature) Te. At the eutectic temperature Te or lower, as illustrated in FIG. 2(a), dispersoids are distributed in a matrix partitioned by grain boundaries. When the liquid phase starts to generate in such a state of the aluminum alloy material, as illustrated in FIG. 2(b), the grain boundaries where the dispersoids are distributed in larger amount due to segregation are melted and turn to liquid phases. Then, as illustrated in FIG. 2(c), surroundings of dispersoid particles of intermetallic compounds of Si which is a main additive element component dispersed in the matrix of the aluminum alloy material, are melted into spherical shapes and turn to liquid phases. Furthermore, as illustrated in FIG. 2(d), the spherical liquid phases generated in the matrix are dissolved again into the matrix in a solid state due to interface energy with the lapse of time or a rise of temperature, and they move to the grain boundaries or surfaces through diffusion in the solid phase. Next, when the temperature rises to T2 as illustrated in FIG. 1, the amount of the liquid phases increases more than that shown in the phase diagram.

When, in FIG. 1, the Si composition of the aluminum alloy material is c2 that is smaller than a maximum solid-solubility limit composition, a liquid phase starts to generate at a temperature near but in excess of a solidus temperature Ts2. However, unlike the case of c1, in a structure immediately before melting, dispersoids do not always exist in the matrix as illustrated in FIG. 3(a). In that case, the grain boundaries are first melted and turn to liquid phases as illustrated in FIG. 3(b). Thereafter, as illustrated in FIG. 3(c), a liquid phase starts to generate from a place where a solute element composition is locally high in the matrix. As in the case of c1, spherical liquid phases generated in the matrix are dissolved again into the matrix in a solid state due to interface energy with the lapse of time or a rise in temperature, and they move to the grain boundaries or surfaces through diffusion in the solid phase, as illustrated in FIG. 3(d). With the temperature rising to T3, the amount of the liquid phase increases more than that is shown in the phase diagram.

A bonding method using the aluminum alloy material for the heat exchanger fin, according to the present invention, utilizes the liquid phase generated with the above-described local melting inside the aluminum alloy material. By holding the mass of the liquid phase in a preferable range with adjustment of a heating temperature, the bonding and shape keeping of the fin can be both realized. When a fin member is fabricated by shaping the aluminum alloy material of the present invention and is subjected to heat treatment at temperature of about 600° C., a liquid phase is partly generated in the fin and bleeds to the material surface, thus enabling the fin to be bonded. As a result, a heat exchanger can be manufactured without using a bonding material such as a brazing filler metal.

In the aluminum alloy material for the heat exchanger fin according to the present invention, the unmelted matrix (i.e., a portion of the aluminum material except for intermetallic compounds) and intermetallic compounds not contributing to the generation of the liquid phase mainly develop the material strength. Therefore, although the aluminum alloy material according to the present invention comes into a state partly melted during the bonding, it can hold the strength sufficient to maintain the shape. Accordingly, the heat exchanger manufactured according to the present invention is featured in that changes in size and shape during the bonding are hardly caused. With such a feature, the aluminum alloy material of the present invention can be preferably used as a material for a thin fin, which is otherwise apt to deform during the bonding.

As described above, the present invention utilizes the liquid phase in the aluminum alloy material. The present invention has two specific features, i.e., (I) the aluminum alloy material is made of an Al—Si-based alloy containing Si at a composition of 1.0% by mass to 5.0% by mass and has a basic composition containing Fe: 0.1% to 2.0% and Mn: 0.1% to 2.0%, and (II) in a microstructure of the aluminum alloy material, intermetallic compounds derived from constituent elements (i.e., Si-based intermetallic compound particles and Al—Fe—Mn—Si-based intermetallic compound particles) are present in respective predetermined ranges of surface density in a cross-section of the aluminum alloy material. Those features are described below. It is to be noted that, in the following description, "% by mass" is simply denoted by "%".

(I) Composition of Aluminum Alloy Material According to Present Invention

As for the Si composition, Si is an element that generates an Al—Si-based liquid phase and contributes to the bonding. However, if the Si composition is less than 1.0%, the liquid phase could not be generated in a sufficient amount, and bleeding of the liquid phase would be reduced, thus making the bonding imperfect. On the other hand, if the Si composition is more than 5.0%, the amount of Si particles in the aluminum alloy material would be increased, and the amount of the liquid phase generated would also be increased. Therefore, the material strength during heating would be extremely reduced, thus causing a difficulty in maintaining the shape of the fin member. For that reason, the Si composition is specified to be 1.0% to 5.0%. The Si composition is preferably 1.5% to 3.5% and more preferably 2.0% to 3.0%. The thicker a plate and the higher a heating temperature, the larger is the amount of the bleeding liquid phase. It is therefore desired that the amount of the liquid phase to bleed during the heating is set by adjusting the amount of Si and the heating temperature for the bonding, which are required depending on the structure and the size of the fin of the heat exchanger to be manufactured.

In the aluminum alloy material according to the present invention, Fe and Mn are added as essential elements to the Al—Si alloy. Here, Fe and Mn are additive elements serving to strengthen the matrix for ensuring the strength that is effective as the fin member, and to generate intermetallic compounds as described later.

Fe is effective not only in increasing the strength by slightly dissolving into the matrix in a solid state, but also in preventing reduction of the strength at high temperatures, particularly, by being dispersed as crystallized deposits. If the amount of Fe added is less than 0.1%, the above-mentioned effects would be reduced, and an ingot with higher purity would have to be used, thus increasing the cost. If the amount of Fe added is more than 2.0%, coarse intermetallic compounds would be generated during casting, and manufacturability would be problematic. Moreover, when the fin made of the aluminum alloy material according to the present invention is exposed to a corrosive environment (particularly, corrosive environment including flow of a liquid), corrosion resistance of the fin would be reduced. In addition, because sizes of grains re-crystallized due to the heating during the bonding are reduced and grain boundary density is increased, change in size between before and after the bonding would be increased. For that reason, the amount of Fe added is specified to be 0.1% to 2.0%. A preferable amount of Fe added is 0.2% to 1.0%.

Mn is an important additive element, which forms Al—Fe—Mn—Si-based intermetallic compounds together with Fe and Si, and which increases the strength by developing the action of dispersion strengthening, or by dissolving into the aluminum matrix in a solid state and developing the action of solid-solution strengthening. If the amount of Mn added is less than 0.1%, the above-mentioned effects would be insufficient. If the amount of Mn added is more than 2.0%, coarse intermetallic compounds would be easily formed and corrosion resistance would be reduced. Accordingly, the amount of Mn added is specified to be 0.1% to 2.0%. A preferable amount of Mn added is 0.3% to 1.5%.

Si forms the Al—Fe—Mn—Si-based intermetallic compounds together with Fe and Mn. However, because Si having formed those intermetallic compounds is less effective in contributing to generation of the liquid phase, there is a risk that bonding performance may degrade. Accordingly, in the aluminum alloy material for the heat exchanger fin according to the present invention, it is preferable to take care of the respective amounts of Si, Fe and Mn added. More specifically, given that the contents (% by mass) of Si, Fe and Mn are denoted by S, F and M, respectively, a relational expression of $1.2 \leq S - 0.3(F+M) \leq 3.5$ is preferably satisfied. If $S - 0.3(F+M)$ is less than 1.2, the bonding would be insufficient. On the other hand, if $S - 0.3(F+M)$ is more than 3.5, the shape would be more apt to change between before and after the bonding.

(II) Microstructure of Aluminum Alloy Material According Present Invention

Features of a microstructure in the aluminum alloy material according to the present invention will be described below. In the aluminum alloy material according to the present invention, there exist not only Si-based intermetallic compounds generated from the basic composition (Al—Si) thereof, but also Al—Fe—Mn—Si-based intermetallic compounds derived from the additive elements Fe and Mn. The present invention is featured in sizes and dispersed states of those intermetallic compounds.

The term "Si-based intermetallic compounds" implies (1) an intermetallic compound of Si alone, and (2) intermetallic compounds of Si and other elements, such as Ca and P, which are partly contained in Si. The Si-based intermetallic compounds are intermetallic compounds contributing to the generation of the liquid phase in the above-described liquid phase generation process. The aluminum alloy material according to the present invention is featured in that 250 pieces/mm$^2$ or more to 7×10$^4$ pieces/mm$^2$ or less of Si-based intermetallic compound particles having equivalent circle diameters of 0.5 to 5 µm are present in a cross-section of the aluminum alloy material. The Si-based intermetallic compound particles, e.g., Si particles, which are dispersed in the aluminum alloy material, react with the surrounding matrix and generate a liquid phase during the bonding. Therefore, the finer the Si-based intermetallic compound particles, the larger is an area where the particles and the matrix contact with each other. Thus, as the Si-based intermetallic compounds are finer, the liquid phase tends to more quickly generate during the heating for the bonding and satisfactory bonding performance are obtained. Furthermore, as the Si-based intermetallic compounds are finer, the shape of the aluminum alloy material can be held more reliably. Those effects are more significant when the bonding temperature is closer to the solidus line or when the temperature rising speed is higher. In the present invention, therefore, it is required that preferable Si-based intermetallic compounds are specified to have equivalent circle diameters of 0.5 to 5 µm, and a presence rate thereof is specified to be 250 pieces/mm$^2$ or more and 7×10$^4$ pieces/mm$^2$ or less in the cross-section of the aluminum alloy material. Although the Si-based intermetallic compounds smaller than 0.5 µm also exist, those Si-based intermetallic compounds are dissolved into the matrix in a solid state during the heating for the bonding before the bonding temperature reaches the solidus line, and are hardly present at the time of the generation of the liquid phase. Thus, because those tiny Si-based intermetallic compounds cannot serve as starting points for the generation of the liquid phase, they are excluded from the preferable specified range. Coarse Si-based intermetallic compounds larger than 5 µm hardly exist, and hence they are also excluded from the preferable specified range. If the number is less than 250 pieces/mm$^2$, the generated liquid phase would be segregated and satisfactory bonding would not be obtained. If the number is more than 7×10$^4$ pieces/mm$^2$, the Si composition would exceed the specified range and the amount of the liquid phase generated would be too large, thus making deformation more likely to occur. For that reason, the presence rate of the Si-based intermetallic compounds is specified to be 250 pieces/mm$^2$ or more and 7×10$^4$ pieces/mm$^2$ or less. The presence rate is preferably 500 pieces/mm$^2$ or more and 5×10$^4$ pieces/mm$^2$ or less and more preferably 1000 pieces/mm$^2$ or more and 2×10$^4$ pieces/mm$^2$ or less. The term "cross-section" implies an arbitrary cross-section of the aluminum alloy material, and it may be, for example, a cross-section taken along the direction of thickness, or a cross-section taken parallel to the plate surface. From the viewpoint of simplicity in material evaluation, the cross-section taken along the direction of thickness is preferably employed.

On the other hand, the Al—Fe—Mn—Si-based intermetallic compounds do not greatly contribute to the generation of the liquid phase unlike the Si-based intermetallic compounds, but they constitute a phase developing the material strength during the heating for the bonding together with the matrix. In consideration of that the aluminum alloy material according to the present invention is used as a thin member, i.e., a fin member of a heat exchanger, the material strength is ensured with proper dispersion of the Al—Fe—Mn—Si-based intermetallic compounds. Since the dispersion of the Al—Fe—Mn—Si-based intermetallic compounds has a large influence upon the grain size after the heating for the bonding, they are needed to be properly dispersed. It is required that 10 pieces/mm$^2$ or more and 1000 pieces/mm$^2$ or less of the Al—Fe—Mn—Si-based intermetallic compounds having equivalent circle diameters of more than 5 µm are present in the material cross-section. If the number is less than 10 pieces/mm$^2$, the strength would be reduced and deformation would be caused. If the number is more than 1000 pieces/mm$^2$, the incidence of nuclei for recrystallization particles during the heating for the bonding would be increased and grain sizes would be reduced. As the grains become smaller, the grains would be more apt to slip relative to each other at the grain boundaries, and deformation would be more likely to occur, thus causing fin buckling. In addition, liquid phases would be generated around the intermetallic compounds during the heating for the bonding, and a rate of a liquid phase area with respect to the plate thickness would be increased, thus causing fin buckling. The Al—Fe—Mn—Si-based intermetallic compounds having equivalent circle diameters of 5 µm or less also exist, and they contribute to increasing the strength of a material plate and the strength during the heating for the bonding and after the heating for the bonding. However, the Al—Fe—Mn—Si-based intermetallic compounds having equivalent circle diameters of 5 µm or less are easily dissolved into the matrix with shift of grain boundaries during the heating for the bonding, and they hardly affect easiness in the occurrence of deformation attributable to the grain sizes after the heating. Hence those tiny Al—Fe—Mn—Si-based intermetallic compounds are excluded from the preferable specified range. Because the Al—Fe—Mn—Si-based intermetallic compounds having equivalent circle diameters of 10 µm or more hardly exist, they are also substantially excluded from the preferable specified range.

The equivalent circle diameters of the above-mentioned Si-based intermetallic compounds can be determined with SEM observation (i.e., observation of a reflected electron image by the Scanning Electron Microscope) of the cross-section. Here, the term "equivalent circle diameter" implies a nominal diameter. Preferably, the equivalent circle diameters of the intermetallic compounds before the bonding are determined by performing an image analysis of an SEM photo. The metal species of the intermetallic compounds can be examined by employing an EPMA (Electron Probe (X-ray) Micro Analyzer), for example. Furthermore, the Si-based intermetallic compounds and the Al—Fe—Mn—Si-based intermetallic compounds can be discriminated from each other based on difference of contrast with the observation of the SEM-reflected electron image. Those intermetallic compounds can be more accurately specified by employing the EPMA, for example.

The above-described aluminum alloy material for the heat exchanger fin, according to the present invention, has the features in the respective composition ranges of the constituent elements and the microstructure, whereby it can realize the bonding with its own bonding performance and can be used as a fin member bonded to other constituent members of the heat exchanger. Here, the other constituent members of the heat exchanger imply a tank, a tube, a side plate, and so on. Depending on the structure of the heat exchanger, fin members each made of the aluminum alloy material according to the present invention may be bonded to each other, or a fin member made of the aluminum alloy material according to the present invention may be bonded to another type of fin member.

As discussed above, in the aluminum alloy material according to the present invention, Si, Fe and Mn are essential elements and their contents are specified to fulfill the basic function of developing the bonding performance and to ensure the strength required as the fin member. In order to further increase the strength and corrosion resistance, other elements than the above-mentioned essential elements can be further added singly or in combination of plural elements. Those other additive elements are described below.

At least one of Mg and Cu is preferably added as a selective additive element that is suitable to further increase the strength.

Mg develops age hardening in the form of $Mg_2Si$ after the heating for the bonding, thus increasing the strength with the age hardening. Hence Mg is an additive element to develop the effect of increasing the strength. If the amount of Mg added is more than 2.0%, Mg would react with flux and form a high-melting compound, thus significantly degrading the bonding performance. Accordingly, the amount of Mg added is specified to be 2.0% or less. A preferable amount of Mg added is 0.05% to 2.0%. In the present invention, as for not only Mg, but also other alloy components, when it is mentioned that the amount of element added is "a predetermined percentage or less", the amount includes 0%.

Cu is an additive element that dissolves into the matrix in a solid state and increases the strength. However, if the amount of Cu added is more than 1.5%, corrosion resistance would be reduced. Accordingly, the amount of Cu added is specified to be 1.5% or less. A preferable amount of Cu added is 0.05% to 1.5%.

In the present invention, one or two or more of Ti, V, Zr, Cr and Ni are preferably added as selective additive elements to further increase the strength.

Ti and V have the effects of not only increasing the strength by being dissolved into the matrix in a solid state, but also preventing the progress of corrosion in the direction of plate thickness by being distributed in a layered pattern. If the amount of each of Ti and V added is more than 0.3%, giant crystallized deposits would be generated, thus degrading formability and corrosion resistance. Accordingly, the amount of each of Ti and V added is preferably specified to be 0.3% or less. A more preferable amount is 0.05% to 0.3%.

Zr is precipitated as Al—Zr-based intermetallic compounds and develops the effect of increasing the strength after the bonding with dispersion strengthening. Moreover, the Al—Zr-based intermetallic compounds act to coarsen grains during the heating. If the amount of Zr added is more than 0.3%, coarse intermetallic compounds would be easily formed and plastic workability would be degraded. Accordingly, the amount of Zr added is preferably specified to be 0.3% or less. A more preferable amount is 0.05% to 0.3%.

Cr increases the strength with solid-solution strengthening and acts to coarsen grains after the heating with precipitation of Al—Cr-based intermetallic compounds. If the amount of Cr added is more than 0.3%, coarse intermetallic compounds would be easily formed and plastic workability would be degraded. Accordingly, the amount of Cr added is preferably specified to be 0.3% or less. A more preferable amount is 0.05% to 0.3%.

Ni is crystallized or precipitated as an intermetallic compound and develops the effect of increasing the strength after the bonding with dispersion strengthening. The amount of Ni added is preferably specified to be 2.0% or less. A more preferable amount is 0.05% to 2.0%. If the Ni content is more than 2.0%, coarse intermetallic compounds would be easily formed, thus degrading workability and self-corrosion resistance.

In addition to the above-mentioned selective additive elements for increasing the strength, other selective additive elements aiming to increase corrosion resistance may also be added. The selective additive elements aiming to increase corrosion resistance are, for example, Zn, In and Sn.

Adding Zn is effective in increasing the corrosion resistance with the sacrificial anticorrosion action. Zn is substantially uniformly dissolved into the matrix in a solid state. However, when a liquid phase is generated, Zn is dissolved into the liquid phase to increase the composition of Zn in the liquid phase. Upon the liquid phase bleeding to the surface, the Zn composition in a bled region of the liquid phase rises, thus increasing the corrosion resistance due to the sacrificial anode action. Furthermore, when the aluminum alloy material of the present invention is applied to heat exchangers, the sacrificial anticorrosion action for protecting tubes, etc. against corrosion can be developed by employing the aluminum alloy material of the present invention as fins. If the amount of Zn added is more than 6.0%, the corrosion rate would be increased and self-corrosion resistance would be reduced. Accordingly, the amount of Zn added is preferably specified to be 6.0% or less. A more preferable amount of Zn added is 0.05% to 6.0%.

Sn and In have the effect of developing the sacrificial anode action. If the amount of each of Sn and In added is more than 0.3%, the corrosion rate would be increased and self-corrosion resistance would be reduced. Accordingly, the amount of each of Sn and In added is preferably specified to be 0.3% or less. A more preferable amount is 0.05% to 0.3%.

In the aluminum alloy material according to the present invention, selective elements for improving characteristics of the liquid phase and further increasing the bonding performance may also be added. In more detail, those elements are preferably Be: 0.1% or less, Sr: 0.1% or less, Bi: 0.1% or less, Na: 0.1% or less, and Ca: 0.05% or less. One or two or more of those elements are added as required. More preferable ranges of those elements are Be: 0.0001% to 0.1%, Sr: 0.0001% to 0.1%, Bi: 0.0001% to 0.1%, Na: 0.0001% to 0.1%, and Ca: 0.0001% to 0.05%. Those trace elements can improve the bonding performance, for example, by causing finer dispersion of Si particles and increasing fluidity of the liquid phase. If the amount of each trace element is less than the above-mentioned more preferable specific range, the effects of causing finer dispersion of Si particles and increasing fluidity of the liquid phase would be insufficient in some cases. If the amount of each trace element is more than the above-mentioned more preferable specific range, a drawback such as reduction of the corrosion resistance would be caused in some cases. Regardless of whether any one or more of Be, Sr, Bi, Na and Ca are added, each element is added in the above-mentioned preferable or more preferable composition range.

The aluminum alloy material for the heat exchanger fin, according to the present invention, satisfies a relation of $T/T_0 \leq 1.40$ where T denotes tensile strength of a material plate, and To denotes tensile strength after heating at 450° C. for 2 hours. With the heating at 450° C. for 2 hours, the aluminum alloy material for the heat exchanger fin, according to the present invention, is sufficiently annealed and becomes an O temper material. T/To represents the rate of strength increase from the strength of the O temper material. In the present aluminum alloy material, it is effective to reduce a final cold-rolling reduction ratio after the annealing in a manufacturing process from the viewpoint of increasing the grain size after the heating for the bonding. If the final reduction ratio is large, driving forces in recrystallization would be increased and the grains during the heating for the bonding would become finer. As the final reduction ratio increases, the strength also increases and T/To takes a larger value. Holding T/To which is an index representing the final reduction ratio to be 1.40 or less, is effective to increase the grain size and prevent the fin from deformation after the heating for the bonding.

In the aluminum alloy material for the heat exchanger fin according to the present invention, the tensile strength before the heating for the bonding is preferably 80 to 250 MPa. If the tensile strength before the heating for the bonding is less than 80 MPa, the sufficient strength required for forming the material sheet to a fin shape would not be obtained, and the fin shape could not be formed. If it is more than 250 MPa, shape sustainability after forming into the fin would be inferior, and a gap would be generated between the fin and another constituent member when they are assembled to a heat exchanger, thus degrading the bonding performance.

Moreover, in the aluminum alloy material for the heat exchanger fin according to the present invention, the tensile strength after the heating for the bonding is also preferably 80 to 250 MPa. If the tensile strength after the heating for the bonding is less than 80 MPa, the strength required for the fin would be insufficient, and deformation would occur upon stress being applied to the heat exchanger. If it is more than 250 MPa, the strength of the fin would be higher than that of another constituent member of the heat exchanger, thus causing a risk of breakage in a bonding portion between the fin and the other constituent member during use.

The aluminum alloy material for the heat exchanger fin according to the present invention has, after the heating for the bonding, a microstructure in which the grain size of the aluminum matrix is preferably 50 μm or more, in a cross-section of the fin. Grain boundary portions are melted during the heating for the bonding. Therefore, if grains are small, the grains would be more likely to slip relative to each other, thus causing deformation. Because it is very difficult to observe the grains during the heating for the bonding, the grain size of the aluminum matrix after the bonding is taken into account for determination. If the grain size after the heating for the bonding is less than 50 μm, the fin member would be susceptible to deformation during the bonding. The grain size of the aluminum matrix is measured in accordance with the grain measurement method of ASTM E112-96, and a mean grain size is calculated.

While the aluminum alloy material for the heat exchanger fin according to the present invention has the above-described features in microstructure in the state before the heating for the bonding, features in microstructure are further developed even after the heating for the bonding. The inventors have found that microstructure, described below, appearing after the heating for the bonding can also be regarded as features of the aluminum alloy material according to the present invention, and that those features are effective in developing the material strength and the bonding strength which are suitable as the fin member of the heat exchanger.

In more detail, in the microstructure of the aluminum alloy material according to the present invention after the heating for the bonding, many intermetallic compounds, etc. exist at the grain boundaries. As seen from the liquid phase generation mechanism illustrated in FIG. 2, in a process where the liquid phase generates and flows out to the outside, the grain boundaries serve as one of liquid phase flowing-out paths. Therefore, liquid phases exist at the grain boundaries during the heating for bonding. Accordingly, with subsequent cooling, the liquid phases are solidified to generate the intermetallic compounds at the grain boundaries. The inventors have found that, in the bonded member in which both the bonding performance and the material strength during the bonding are satisfactorily balanced, the number of triple points of grain boundaries where the Si-based intermetallic compounds and the Al—Fe—Mn—Si-based intermetallic compounds having equivalent circle diameters of 1 μm or more exist, is 50% or more of the total number of triple points of all the grain boundaries. Here, the term "triple point of grain boundaries" implies a point (triple point) at which at least three or more grain boundaries in the matrix intersect, when observing a cross-section of the aluminum alloy material.

The above-mentioned intermetallic compounds existing at the triple points of the grain boundaries function as second-phase dispersed particles having the dispersion strengthening action, and develop the function of strengthening the fin member of the heat exchanger. Moreover, the intermetallic compounds exhibit the effect of suppressing growth of grains during cooling after the heating for bonding the member. In addition, when the bonded fin is reheated, the intermetallic compounds exhibit the effect of suppressing coarsening of grains in the fin. These effects would be insufficiently obtained if the rate of the number of triple points of the grain boundaries where the intermetallic compounds exist is less than 50%. For this reason, the number of triple points of the grain boundaries where the intermetallic compounds having the equivalent circle diameters of 1 μm or more exist is preferably specified to be 50% or more of the number of triple points of all the grain boundaries. That rate is more preferably 80% or more. An upper limit value of that rate is 100%.

The intermetallic compounds existing at the triple points of the grain boundaries include Al—Fe—Mn—Si-based intermetallic compounds and Si-based intermetallic compounds. The Si-based intermetallic compounds include an intermetallic compound of Si alone, and intermetallic compounds of Si and other elements, such as Ca and P, which are partly contained in Si. The Al—Fe—Mn—Si-based intermetallic compounds are intermetallic compounds made of Al and one or more additive elements, such as Al—Fe-based, Al—Mn-based, Al—Fe—Si-based, Al—Mn—Si-based, Al—Fe—Mn-based, and Al—Fe—Mn—Si-based compounds.

The presence of the intermetallic compounds existing at the triple points of the grain boundaries can be identified by several methods. With a method using an optical microscope, a cross-section of the fin member after the bonding is mechanically ground and etched using the Keller's reagent, for example. Positions of the intermetallic compounds are then identified. Furthermore, grain boundaries in the relevant cross-section are made clear by the anodic oxidation method, and the positions of triple points of the grain boundaries are identified. By comparing both the identification results, a rate of the number of triple points of the grain boundaries where the intermetallic compounds having the equivalent circle diameters of 1 μm or more exist is determined with respect to the number of triple points of all the grain boundaries.

When the liquid phase existing at the grain boundaries is solidified and transformed to a eutectic structure, there is a possibility that the intermetallic compounds are discontinuously formed at the grain boundaries, or that a eutectic structure is formed in which an Al phase and an intermetallic compound phase are alternately arranged. In such a case, because the grain boundaries are not clear, the grain boundaries are often observed as discontinuous lines, and the positions of the triple points of the grain boundaries are not clear. In that case, the intermetallic compounds and the eutectic structure are regarded as parts of the grain boundaries, and the triple points of the grain boundaries are discriminated by drawing continuous imaginary lines along the grain boundaries. When a Si phase (not illustrated) and the eutectic structure are large and the triple point of the grain boundaries is not clear as illustrated in FIG. 5, the entire area of such a portion is regarded as representing the grain boundaries as illustrated in FIG. 6. As denoted by a dotted line in FIG. 6, a region where three grain boundaries imaginarily intersect is regarded as the triple point. The triple point in the above-mentioned case is given as an area resulting from combining respective grain boundary portions in a region where the three grain boundaries intersect. It is just required that the intermetallic compounds are formed even in a part of the above-mentioned triple point area.

The triple point may also be identified by a method using an EPMA (Electron Probe (X-ray) Micro Analyzer). This method is to analyze surface components of elements, such as Si and Fe, in a cross-section of the fin member by employing the EPMA. Because the Si composition is reduced near the grain boundaries, the grain boundaries can be identified. The intermetallic compounds can be identified from portions where the compositions of elements, such as Si and Fe, are high. Respective positions of the grain boundaries and the intermetallic compounds can also be identified with SEM observation (observation of a reflected electron image by the Scanning Electron Microscope) of the cross-section.

The aluminum alloy material for the heat exchanger fin according to the present invention has another feature in microstructure after the heating for bonding. In more detail, a bond junction of the aluminum alloy material according to the present invention has a microstructure that, through the liquid phase generation mechanism described above, the surroundings of Si particles are melted each in the form of a sphere while remaining in the matrix to some extent, and that many eutectic structures, illustrated in FIG. 2(*d*), are dispersed within each grain of the matrix (hereinafter referred to simply as "within grain"). The inventors have found that, in the aluminum alloy material according to the present invention in which both the bonding performance and the material strength during the bonding are satisfactorily balanced, it is preferable to have 10 pieces/mm$^2$ to 3000 pieces/mm$^2$ of eutectic structures having lengths of 3 μm or more within the grains in the microstructure after the bonding in terms of surface density in a cross-section of the fin member. With respect to the above-mentioned preferable condition of the microstructure, if the surface density of the eutectic structures within the grains is less than 10 pieces/mm$^2$, the amount of the liquid phase taking part in the bonding would be too large, thus raising a difficulty in maintaining the strength during the heating for the bonding in some cases. On the other hand, if the surface density of the eutectic structures within the grains is more than 3000 pieces/mm$^2$, the amount of the liquid phase taking part in the bonding would be too small, thus reducing the bonding performance in some cases.

The above-mentioned eutectic structures within the grains are formed through a process that the liquid phase having been generated during the heating from melted surroundings of Si particles in the form of a sphere is solidified during the cooling. Therefore, each of the eutectic structures often takes the shape close to a sphere. Thus, as illustrated in FIG. 2, those eutectic structures are observed as circular eutectic structures when observed at a cross-section thereof. Moreover, when the liquid phase is generated with the Al—Fe—Mn—Si-based intermetallic compounds serving as nuclei generation sites and remains within the grains, eutectic structures having the shapes following the Al—Fe—Mn—Si-based intermetallic compounds may sometimes be formed.

The surface density of the eutectic structures within the grains in the cross-section of the eutectic structure can be measured by several methods. With a method using an optical microscope, a cross-section of the member constituting the structural body of the present invention is mechanically ground and etched using the Keller's reagent, for example. Positions of the eutectic structures are then identified. The eutectic structures can be discriminated because the Si-based intermetallic compound phase and the Al phase are finely alternately arranged in the eutectic structures. Furthermore, the positions of the grain boundaries in the relevant cross-section are identified with the aid of the anodic oxidation method. By comparing both the identification results, the number of the eutectic structure having length of 3 μm or more existing within the grains and is measured and converted to the surface density.

The surface density may also be measured by a method using the EPMA. This method is to analyze surface components of elements, such as Si and Fe, in a cross-section of the member constituting the structural body by employing the EPMA. The eutectic structures can be identified because a portion where the Si composition is high and another portion where it is low are finely alternately arranged in the eutectic structures. Furthermore, the grain boundaries can be identified because the Si composition is reduced near the grain boundaries. The eutectic structures can also be identified with the SEM observation of the cross-section. In that case, the grain boundaries are identified by the SEM/EBSB method.

The above-described microstructure developed in the aluminum alloy material after the heating for the bonding can be obtained with adjustment of the composition thereof and adjustment of the heating conditions in consideration of the composition. For example, when the temperature during the bonding is high, the liquid phase can be generated in a sufficient amount even with the Si amount set to be relatively low. More specifically, in the case of a fin member having a plate thickness of 30 μm to 100 μm, it is preferable that the amount of Si added is about 1.5% to 3.5% and the heating temperature is about 580° C. to 620° C. In that case, the number of the eutectic structures within the grains is 20 to 500/mm$^2$. Thus, satisfactory bonding performance can be obtained by previously adjusting the amount of Si added in the aluminum alloy material constituting a member to be bonded in the range of 1.5% to 5.0% such that the surface density of the eutectic structures within the grains in the cross-section of the eutectic structures falls within the range of 10/mm$^2$ to 3000/mm$^2$ with the observation of the structure after the bonding. Moreover, adding 0.3% or more of Mn is effective in reducing the eutectic structures within the grains.

A manufacturing method for the aluminum alloy material for the heat exchanger fin according to the present invention, will be described below. The aluminum alloy material of the present invention is cast by a DC (Direct Chill) casting method, and a casting speed of a slab during the casting is controlled as follows. Because the casting speed affects the cooling rate, the casting speed is set to be 20 to 100 mm/min. If the casting speed is less than 20 mm/min, a sufficient cooling rate would not be obtained and the crystallized intermetallic compounds, such as the Si-based intermetallic compounds and the Al—Fe—Mn—Si-based intermetallic compounds, would be coarsened. On the other hand, if the casting speed is more than 100 mm/min, the aluminum material would not be sufficiently solidified during the casting, and a normal ingot could not be obtained. A more preferable casting speed is 30 to 80 mm/min. Furthermore, in order to obtain the microstructure as one of the features of the present invention, the casting speed can be adjusted depending on the composition of the alloy material to be manufactured. Though depending on the cross-sectional shape of the slab, including the thickness and the width thereof, the cooling rate can be obtained at 0.1 to 2° C./sec in a central portion of an ingot by setting the casting speed to be 20 to 100 mm/min as described above.

An ingot (slab) thickness in the case of employing the DC casting method is preferably 600 mm or less. If the slab thickness is more than 600 mm, a sufficient cooling rate would not be obtained and the intermetallic compounds would be coarsened. A more preferable slab thickness is 500 mm or less.

The slab having been manufactured by the DC casting method is subjected to a heating step before hot rolling, a hot rolling step, a cold rolling step, and an annealing step. After the casting, the slab may be subjected to a homogenizing process before the hot rolling.

The slab having been manufactured by the DC casting method is subjected to the heating step before the hot rolling after the homogenizing process or without being subjected to the homogenizing process. The heating step is preferably performed on condition that a heating retention temperature is set to be 400 to 570° C., and a retention time is set to be 0 to 15 hours. If the retention temperature is lower than 400° C., deformation resistance of the slab during the hot rolling would be increased, thus causing a risk of cracking. If the retention temperature is higher than 570° C., there would be a risk of local melting. If the retention time is longer than 15 hours, precipitation of the Al—Fe—Mn—Si-based intermetallic compounds would be progressed, whereby precipitated deposits would be coarsened and distributed loosely. Therefore, the incidence of nuclei for recrystallization particles during the heating for the bonding would be increased and the grain sizes would be reduced. The expression of "the retention time being 0 hour" implies that the heating is ended immediately after reaching the heating retention temperature.

Subsequent to the heating step, the slab is subjected to a hot rolling step. The hot rolling step includes a rough rolling stage and a finish rolling stage. Here, a total reduction ratio in the hot rough rolling stage is set to be 92 to 97%, and the hot rough rolling stage includes three or more passes of rough rolling in each of which the reduction ratio is 15% or more.

In the slab manufactured by the DC casting method, coarse crystallized deposits are generated in a finally solidified portion. Because the crystallized deposits undergo shearing attributable to the rolling and are fragmented to smaller pieces in a plate rolling step, the crystallized deposits are observed in the particulate form after the rolling. The hot rolling step includes the hot rough rolling stage for rolling the slab into a plate having a certain thickness, and a hot finish rolling stage for rolling the plate to have a thickness of about several mm. Control of a reduction ratio in the hot rough rolling stage for rolling the slab is important for the fragmentation of the crystallized deposits. More specifically, in the hot rough rolling stage, the slab is rolled from a thickness of 300 to 700 mm to about 15 to 40 mm. The coarse crystallized deposits can be finely fragmented by setting conditions such that a total reduction ratio in the hot rough rolling stage is 92 to 97%, and that the hot rough rolling stage includes three or more passes in each of which a reduction ratio is 15% or more. With those conditions, the Si-based intermetallic compounds and the Al—Fe—Mn—Si-based intermetallic compounds, i.e., the crystallized deposits, can be made finer, and the proper distribution state specified in the present invention can be obtained.

If the total reduction ratio in the hot rough rolling stage is less than 92%, the effect of making the crystallized deposits finer could not be sufficiently obtained. On the other hand, if it is more than 97%, the slab thickness would be substantially excessive, and the cooling rate during the casting would be slowed, whereby the crystallized deposits would be coarsened. Therefore, the crystallized deposits could not be sufficiently fragmented into finer pieces even with the hot rough rolling. The reduction ratio in each of the passes in the hot rough rolling stage also affects the distribution of the intermetallic compounds. By increasing the reduction ratio in each pass, the crystallized deposits are fragmented. If the number of passes in each of which the reduction ratio is 15% or more is less than three, the effect of making the crystallized deposits finer could not be sufficiently obtained. If the reduction ratio is less than 15%, the reduction ratio would be too low and the crystallized deposits could not be fragmented into smaller pieces. Hence such a case is excluded from the specified range. While an upper limit of the number of passes in each of which the reduction ratio is 15% or more is not specified to a particular value, it is set to about ten from the practical point of view.

After the hot rolling stage, the hot-rolled plate is subjected to a cold rolling step. Conditions of the cold rolling step are not limited to particular ones. Midway the cold rolling step, an annealing step is performed to sufficiently anneal the cold-rolled plate to obtain a recrystallized structure. After the annealing step, the rolled plate is subjected to final cold rolling to have a final plate thickness. If the reduction ratio, i.e., {(plate thickness before rolling–plate thickness after rolling)/plate thickness before rolling}×100(%), in a final cold rolling stage is too large, driving forces in recrystallization during the heating for the bonding would be increased, and the grains would become smaller, thus increasing deformation during the heating for the bonding. For that reason, as described above, the reduction ratio in the final cold rolling stage is set such that T/To is held to be 1.40 or less. The reduction ratio in the final cold rolling stage is preferably set to be about 10 to 30%.

A bonding method for the aluminum alloy material according to the present invention will be described below. The present invention utilizes the bonding ability developed by the aluminum alloy material itself without using the brazing filler metal. Taking into account the case where the aluminum alloy material is employed as a fin member of a heat exchanger, deformation of the fin member is a serious problem. Accordingly, it is also important to control conditions for the heating for the bonding. In more detail, the aluminum alloy material is heated for a time necessary for the bonding at temperature that is in a range of not lower than a solidus temperature and not higher than a liquidus temperature where a liquid phase is generated inside the aluminum alloy material according to the present invention, and that is not higher than a temperature at which the strength is reduced and the shape cannot be maintained due to the generation of the liquid phase in the aluminum alloy material.

As a more specific heating condition, the bonding requires to be performed at temperature at which a ratio (hereinafter referred to as a "liquid phase ratio") of a mass of a liquid phase generated in the aluminum alloy material constituting the fin member to a total mass of the relevant aluminum alloy material is more than 0% and 35% or less. Because the bonding cannot be performed unless the liquid phase is generated, the liquid phase ratio needs to be more than 0%. However, if the amount of the liquid phase is small, the bonding is difficult to perform in some cases. For that reason, the liquid phase ratio is preferably 5% or more. If the liquid phase ratio is more than 35%, the amount of the liquid phase generated would be too large, and the aluminum alloy material would be deformed during the heating for the bonding to such a large extent as not maintaining the shape. Thus, the liquid phase ratio is preferably 5 to 30% and more preferably 10 to 20%.

In order to ensure that the liquid phase is sufficiently filled between the fin and another member, it is also preferable to take into account a time required for the filling. From that point of view, a time during which the liquid phase ratio is 5% or more is preferably specified to be 30 sec or longer and 3600 sec or shorter. More preferably, the time during which the liquid phase ratio is 5% or more is 60 sec or longer and 1800 sec or shorter. With that condition, more sufficient filling of the liquid phase is ensured, and more reliable bonding is performed. If the time during which the liquid phase ratio is 5% or more is shorter than 30 sec, the liquid phase would not be sufficiently filled to a bonding portion in some cases. On the other hand, if it is longer than 3600 sec, deformation of the aluminum material would be progressed in some cases. It is to be noted that, in the bonding method according to the present invention, since the liquid phase is moved only in the very close vicinity of the bonding portion, the time required for the filling does not depend on the size of the bonding portion.

As a practical example of the desired heating conditions, in the case of the aluminum alloy material according to the present invention, the bonding temperature is set to be 580° C. to 640° C., and the retention time at the bonding temperature is set to be about 0 min to 10 min. Here, 0 min implies that cooling is started immediately after a member temperature has reached the predetermined bonding temperature. The retention time is more preferably 30 sec to 5 min. Regarding the bonding temperature, in the case of the Si content being of about 1 to 1.5%, for example, the heating temperature for the bonding is desirably set to a slightly higher range, i.e., 610 to 640° C. To the contrary, in the case of the Si content being of about 4 to 5%, the heating temperature for the bonding is desirably set to a slightly lower range, i.e., 580 to 590° C. Moreover, in order that the microstructure of the bonding portion comes into a suitable state described later, the heating conditions may be adjusted depending on the composition.

It is very difficult to measure the actual liquid phase ratio during the heating. Therefore, the liquid phase ratio specified in the present invention is usually determined based on the lever rule from an alloy composition and a maximum achievable temperature by utilizing an equilibrium diagram. In an alloy system for which an equilibrium diagram is already clarified, the liquid phase ratio can be determined based on the lever rule by utilizing that equilibrium diagram. On the other hand, regarding an alloy system for which an equilibrium diagram is not publicized, the liquid phase ratio can be determined by employing equilibrium phase-diagram calculation software. A method of determining the liquid phase ratio based on the lever rule by employing an alloy composition and a temperature is incorporated in the equilibrium phase-diagram calculation software. One example of the equilibrium phase-diagram calculation software is Thermo-Calc made by Thermo-Calc Software AB. Even for the alloy system for which the equilibrium diagram is clarified, the equilibrium phase-diagram calculation software may also be utilized for simplification because the result obtained by calculating the liquid phase ratio with the equilibrium phase-diagram calculation software is the same as that obtained by determining the liquid phase ratio based on the lever rule using the equilibrium diagram.

A heating atmosphere in the heat treatment is preferably a non-oxidizing atmosphere in which air is replaced with nitrogen or argon, for example. More satisfactory bonding performance can be obtained by employing non-corrosive flux. In addition, the bonding may be performed with heating under vacuum or reduced pressure.

The above-mentioned non-corrosive flux can be applied, for example, by a method of, after assembling the bonded members, sprinkling flux powder over them, or a method of suspending flux powder in water and spraying the suspension solution. In the case of coating the non-corrosive flux over a material plate in advance, adhesion of a coating can be increased by mixing a binder, e.g., an acrylic resin, to flux powder, and then coating the mixture. Examples of the non-corrosive flux, which is used to obtain the ordinary function of flux, include fluoride-based fluxes such as $KAlF_4$, $K_2AlF_5$, $K_2AlF_5 \cdot H_2O$, $K_3AlF_6$, $AlF_3$, $KZnF_3$, and $K_2SiF_6$, and cesium-based fluxes such as $Cs_3AlF_6$, $CsAlF_4 \cdot 2H_2O$, and $Cs_2AlF_5 \cdot H_2O$.

The aluminum alloy material for the heat exchanger fin, according to the present invention, can be satisfactorily bonded through the above-described control of the heat treatment and the heating atmosphere. However, because of the fin member being in the form of a thin plate, if stress generated inside the fin member is too high, the fin shape could not be maintained in some cases. In particular, when the liquid phase ratio is increased during the bonding, the shape can be satisfactorily maintained by holding the stress generated inside the fin member to be comparatively small. When it is desired to take the stress inside the fin member into consideration as in the above-mentioned case, very stable bonding can be obtained by satisfying a condition of $P \leq 460 - 12V$ where P (kPa) is a maximum value of stresses generated inside the fin member, and V (%) is the liquid phase ratio. A value denoted by the right side (460−12V) of the above expression represents threshold stress. If stress in excess of the threshold stress is exerted on the aluminum alloy material in which the liquid phase is generated, there is a risk that large deformation may occur. The stress generated in the fin member can be determined from the shape and the load. For example, the stress can be calculated by employing, e.g., a structural calculation program.

Advantageous Effect of the Invention

As described above, the aluminum alloy material for the heat exchanger fin, according to the present invention, is bonded by a bonding method different from the known bonding method, e.g., the brazing method, and it can exert a bonding function under heating of a single-layer of the aluminum alloy material. Furthermore, the aluminum alloy material hardly causes change in size or shape between before and after the bonding, and it can satisfy requirements in terms of strength.

A heat exchanger constituted by bonding a fin member made of the aluminum alloy material according to the present invention with another constituent member, including another fin member, can be manufactured without using a bonding material, such as a brazing filler metal, thus satisfying the demand for cost reduction of equipment.

Moreover, the heat exchanger obtained by heating and bonding the fin member made of the aluminum alloy material according to the present invention has the features in the microstructure in a fin cross-section. More specifically, the number of triple points of the grain boundaries where the Si-based intermetallic compounds and the Al—Fe—Mn—Si-based intermetallic compounds having the equivalent circle diameters of 1 μm or more, exist is 50% or more of the number of triple points of all the grain boundaries. Furthermore, in the microstructure in the fin cross-section, the eutectic structures having lengths of 3 μm or more exist in number of 10/mm² or more and 3000/mm² or less within the grains. The heat exchanger according to the present invention is superior in terms of strength as well because the fin has the above-mentioned features in the microstructure.

MODE FOR CARRYING OUT THE INVENTION

Figure 1:
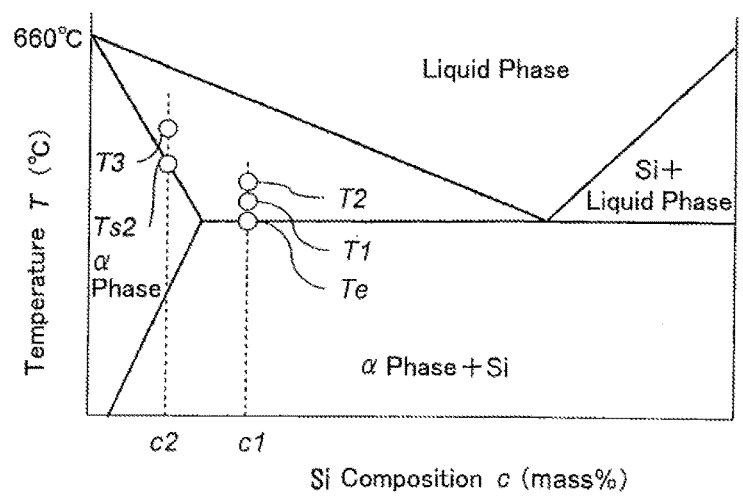
FIG. 1 illustrates a phase diagram of an Al—Si alloy that is a binary eutectic alloy.54r
Figure 2:
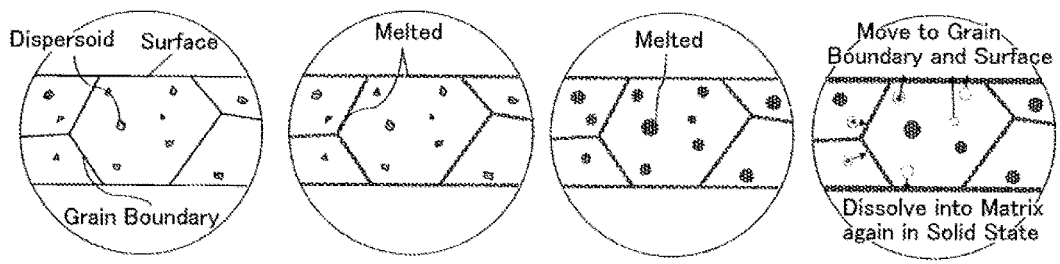
FIG. 2 is an explanatory view to explain a liquid phase generation mechanism in an aluminum alloy material according to the present invention, which is developed with a bonding method using the aluminum alloy material.
Figure 3:
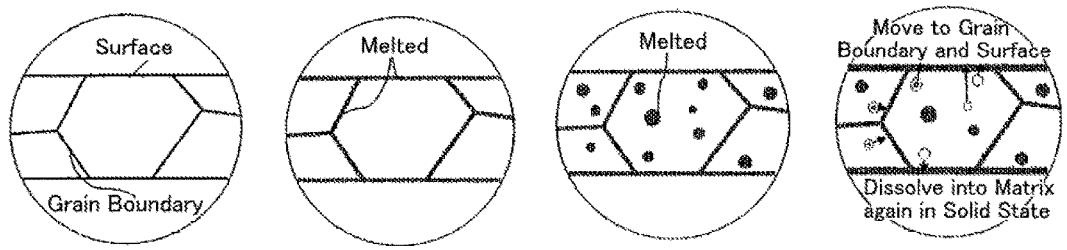
FIG. 3 is an explanatory view to explain a liquid phase generation mechanism in the aluminum alloy material according to the present invention, which is developed with the bonding method using the aluminum alloy material.

The present invention will be described in detail below in connection with Inventive Examples and Comparative Examples.

First Embodiment

Test Plates Having Compositions A1 to A56 and B1 in Tables 1 and 2 were first cast in sizes of 400 mm thick, 1000 mm wide, and 3000 mm long by the DC casting method. The casting speed was set to 40 mm/min. In the alloy compositions of Table 1, "-" represents that the content is not more than a detection limit, and "balance" includes inevitable impurities. After facing an ingot into a thickness of 380 mm, the ingot was heated up to 500° C. and that temperature was held for 5 hours as a heating retention step before hot rolling. The ingot was then subjected to the hot rolling step. In the hot rough rolling stage of the hot rolling step, the total reduction ratio was set to 93%, and the ingot was rolled to a thickness of 27 mm in the relevant stage. In the hot rough rolling stage, the number of passes in each of which the reduction ratio was 15% or more was set to five. After the hot rough rolling stage, a rolled plate was further rolled to a thickness of 3 mm in the hot finish rolling stage. In the subsequent cold rolling step, the rolled plate was rolled to a thickness of 0.09 mm. Furthermore, the rolled plate was subjected to an intermediate annealing step of 380° C.×2 hours. Finally, the rolled plate was rolled to a final thickness of 0.07 mm in a final cold rolling stage, whereby a sample plate was obtained. In Comparative Examples 7 to 9, after rolling the plate to a thickness of 3 mm in the hot finish rolling stage, the rolled plate was further cold-rolled to a thickness of 0.120 mm in the cold rolling step. Furthermore, the rolled plate was subjected to the intermediate annealing step of 380° C.×2 hours and then rolled to a final thickness of 0.07 mm in the final cold rolling stage, whereby a sample plate was obtained.

TABLE 1

| Composition No. | | Alloy Composition (mass %) | | | | | | | | | | | | | | | | | |
|---|---|---|---|---|---|---|---|---|---|---|---|---|---|---|---|---|---|---|---|
| | | Si | Fe | Cu | Mn | Mg | Zn | In | Sn | Ni | Ti | V | Zr | Cr | Be | Sr | Bi | Na | Ca | Al |
| IE | A1 | 1.5 | 0.25 | — | 1.0 | — | — | — | — | — | — | — | — | — | — | — | — | — | — | balance |
| | A2 | 2.0 | 0.25 | — | 1.0 | — | — | — | — | — | — | — | — | — | — | — | — | — | — | balance |
| | A3 | 3.0 | 0.25 | — | 1.0 | — | — | — | — | — | — | — | — | — | — | — | — | — | — | balance |
| | A4 | 3.5 | 0.25 | — | 1.0 | — | — | — | — | — | — | — | — | — | — | — | — | — | — | balance |
| | A5 | 4.8 | 0.25 | — | 1.0 | — | — | — | — | — | — | — | — | — | — | — | — | — | — | balance |
| | A6 | 2.5 | 0.1 | — | 1.0 | — | — | — | — | — | — | — | — | — | — | — | — | — | — | balance |
| | A7 | 2.5 | 0.2 | — | 1.0 | — | — | — | — | — | — | — | — | — | — | — | — | — | — | balance |
| | A8 | 2.5 | 1.0 | — | 1.0 | — | — | — | — | — | — | — | — | — | — | — | — | — | — | balance |
| | A9 | 2.5 | 2.0 | — | 1.0 | — | — | — | — | — | — | — | — | — | — | — | — | — | — | balance |
| | A10 | 2.5 | 0.5 | — | 0.12 | — | — | — | — | — | — | — | — | — | — | — | — | — | — | balance |
| | A11 | 2.5 | 0.25 | — | 1.90 | — | — | — | — | — | — | — | — | — | — | — | — | — | — | balance |
| | A12 | 2.5 | 2.00 | — | 2.00 | — | — | — | — | — | — | — | — | — | — | — | — | — | — | balance |
| | A13 | 2.5 | 0.25 | 0.1 | 1.0 | — | — | — | — | — | — | — | — | — | — | — | — | — | — | balance |
| | A14 | 2.5 | 0.25 | 1.5 | 1.0 | — | — | — | — | — | — | — | — | — | — | — | — | — | — | balance |
| | A15 | 2.5 | 0.25 | — | 1.0 | 0.1 | — | — | — | — | — | — | — | — | — | — | — | — | — | balance |
| | A16 | 1.0 | 0.5 | — | 1.2 | 2.0 | — | — | — | — | — | — | — | — | — | — | — | — | — | balance |
| | A17 | 2.5 | 0.25 | — | 1.0 | — | 0.08 | — | — | — | — | — | — | — | — | — | — | — | — | balance |
| | A18 | 2.5 | 0.25 | — | 1.0 | — | 0.12 | — | — | — | — | — | — | — | — | — | — | — | — | balance |
| | A19 | 2.5 | 0.25 | — | 1.0 | — | 0.5 | — | — | — | — | — | — | — | — | — | — | — | — | balance |
| | A20 | 2.5 | 0.25 | — | 1.0 | — | 1.2 | — | — | — | — | — | — | — | — | — | — | — | — | balance |
| | A21 | 2.5 | 0.25 | — | 1.0 | — | 2.0 | — | — | — | — | — | — | — | — | — | — | — | — | balance |
| | A22 | 2.5 | 0.25 | — | 1.0 | — | 5.5 | — | — | — | — | — | — | — | — | — | — | — | — | balance |
| | A23 | 2.5 | 0.25 | 1.0 | 1.0 | — | 2.0 | — | — | — | — | — | — | — | — | — | — | — | — | balance |

TABLE 1-continued

| Composition No. | Alloy Composition (mass %) | | | | | | | | | | | | | | | | | |
|---|---|---|---|---|---|---|---|---|---|---|---|---|---|---|---|---|---|---|
| | Si | Fe | Cu | Mn | Mg | Zn | In | Sn | Ni | Ti | V | Zr | Cr | Be | Sr | Bi | Na | Ca | Al |
| A24 | 2.5 | 0.25 | — | 1.0 | — | 2.0 | — | — | — | 0.1 | — | — | — | — | — | — | — | — | balance |
| A25 | 2.5 | 0.25 | — | 1.0 | — | 2.0 | — | — | — | — | 0.1 | — | — | — | — | — | — | — | balance |
| A26 | 2.5 | 0.25 | — | 1.0 | — | — | 0.05 | — | — | — | — | — | — | — | — | — | — | — | balance |
| A27 | 2.5 | 0.25 | — | 1.0 | — | — | 0.3 | — | — | — | — | — | — | — | — | — | — | — | balance |
| A28 | 2.5 | 0.25 | — | 1.0 | — | — | — | 0.05 | — | — | — | — | — | — | — | — | — | — | balance |
| A29 | 2.5 | 0.25 | — | 1.0 | — | — | — | 0.3 | — | — | — | — | — | — | — | — | — | — | balance |
| A30 | 2.5 | 0.25 | — | 1.0 | — | — | — | — | 0.05 | — | — | — | — | — | — | — | — | — | balance |
| A31 | 2.5 | 0.25 | — | 1.0 | — | — | — | — | 0.1 | — | — | — | — | — | — | — | — | — | balance |
| A32 | 2.5 | 0.25 | — | 1.0 | — | — | — | — | 2.0 | — | — | — | — | — | — | — | — | — | balance |
| A33 | 2.5 | 0.25 | — | 1.0 | — | — | — | — | — | 0.05 | — | — | — | — | — | — | — | — | balance |
| A34 | 2.5 | 0.25 | — | 1.0 | — | — | — | — | — | 0.3 | — | — | — | — | — | — | — | — | balance |
| A35 | 2.5 | 0.25 | — | 1.0 | — | — | — | — | — | — | 0.05 | — | — | — | — | — | — | — | balance |
| A36 | 2.5 | 0.25 | — | 1.0 | — | — | — | — | — | — | 0.3 | — | — | — | — | — | — | — | balance |
| A37 | 2.5 | 0.25 | — | 1.0 | —+ | — | — | — | — | — | — | 0.05 | — | — | — | — | — | — | balance |
| A38 | 2.5 | 0.25 | — | 1.0 | — | — | — | — | — | — | — | 0.3 | — | — | — | — | — | — | balance |
| A39 | 2.5 | 0.25 | — | 1.0 | — | — | — | — | — | — | — | — | 0.05 | — | — | — | — | — | balance |
| A40 | 2.5 | 0.25 | — | 1.0 | — | — | — | — | — | — | — | — | 0.3 | — | — | — | — | — | balance |
| A41 | 2.5 | 0.25 | — | 1.0 | — | — | — | — | — | — | — | — | — | 0.001 | — | — | — | — | balance |
| A42 | 2.5 | 0.25 | — | 1.0 | — | — | — | — | — | — | — | — | — | 0.1 | — | — | — | — | balance |
| A43 | 2.5 | 0.25 | — | 1.0 | — | — | — | — | — | — | — | — | — | — | 0.001 | — | — | — | balance |
| A44 | 2.5 | 0.25 | — | 1.0 | — | — | — | — | — | — | — | — | — | — | 0.1 | — | — | — | balance |
| A45 | 2.5 | 0.25 | — | 1.0 | — | — | — | — | — | — | — | — | — | — | — | 0.001 | — | — | balance |
| A46 | 2.5 | 0.25 | — | 1.0 | — | — | — | — | — | — | — | — | — | — | — | 0.1 | — | — | balance |
| A47 | 2.5 | 0.25 | — | 1.0 | — | — | — | — | — | — | — | — | — | — | — | — | 0.001 | — | balance |
| A48 | 2.5 | 0.25 | — | 1.0 | — | — | — | — | — | — | — | — | — | — | — | — | 0.1 | — | balance |
| A49 | 2.5 | 0.25 | — | 1.0 | — | — | — | — | — | — | — | — | — | — | — | — | — | 0.001 | balance |
| A50 | 2.5 | 0.25 | — | 1.0 | — | — | — | — | — | — | — | — | — | — | — | — | — | 0.05 | balance |

IE: Inventive Example

[Table 2]

TABLE 2

| Composition No. | Alloy Composition (mass %) | | | | | | | | | | | | | | | | | |
|---|---|---|---|---|---|---|---|---|---|---|---|---|---|---|---|---|---|---|
| | Si | Fe | Cu | Mn | Mg | Zn | In | Sn | Ni | Ti | V | Zr | Cr | Be | Sr | Bi | Na | Ca | Al |
| CE A51 | 0.9 | 0.25 | — | 0.5 | — | — | — | — | — | — | — | — | — | — | — | — | — | — | balance |
| A52 | 5.3 | 0.25 | — | 0.5 | — | — | — | — | — | — | — | — | — | — | — | — | — | — | balance |
| A53 | 3.5 | 0.05 | — | 0.12 | — | — | — | — | — | — | — | — | — | — | — | — | — | — | balance |
| A54 | 3.5 | 0.1 | — | 0.08 | — | — | — | — | — | — | — | — | — | — | — | — | — | — | balance |
| A55 | 2.5 | 2.5 | — | 1.0 | — | — | — | — | — | — | — | — | — | — | — | — | — | — | balance |
| A56 | 2.5 | 0.25 | — | 2.2 | — | — | — | — | — | — | — | — | — | — | — | — | — | — | balance |
| CP B1 | 0.5 | 0.3 | 0.15 | 1.0 | — | — | — | — | — | — | — | — | — | — | — | — | — | — | balance |

CE: Comparative Example
CP: Combined Plate

The above-mentioned test plates were evaluated for manufacturability in the manufacturing process. The manufacturability was evaluated by a method of, in manufacturing each plate or slab, rating the test plate to be ◯ (acceptable) when the sound plate or slab was obtained without causing any problems during the manufacturing process, and rating the test plate to be x (unacceptable) when any problem occurred during the manufacturing process, such as the occurrence of cracking during the casting, or a difficulty in continuing the rolling due to generation of giant intermetallic compounds during the casting.

The surface density of the intermetallic compounds in the manufactured plate (material plate) was measured with SEM observation (observation of a reflected electron image) of a cross-section of the plate taken in the direction of plate thickness. The Si-based intermetallic compounds and the Al—Fe—Mn—Si-based intermetallic compounds were discriminated based on the difference in contrast with the observation of the SEM-reflected electron image. The observation was performed on three viewing fields for each sample. The respective surface densities of the Si-based intermetallic compounds having the equivalent circle diameters of 0.5 μm to 5 μm and the Al—Fe—Mn—Si-based intermetallic compounds having the equivalent circle diameters of 5 μm or more in the sample were measured through an image analysis of an SEM photo in each viewing field.

Tensile tests were performed on the material before and after the heating for the bonding of each manufactured plate and after heating at 450° C. for 2 hours. The tensile tests were carried out on each sample at room temperature on conditions of a tensile speed of 10 mm/min and a gauge length of 50 mm in accordance with JIS Z2241. In the tensile test after the heating for the bonding, the sample was evaluated by heating it under the same conditions of the heating for the bonding as those set for a mini-core described below.

Figure 4:
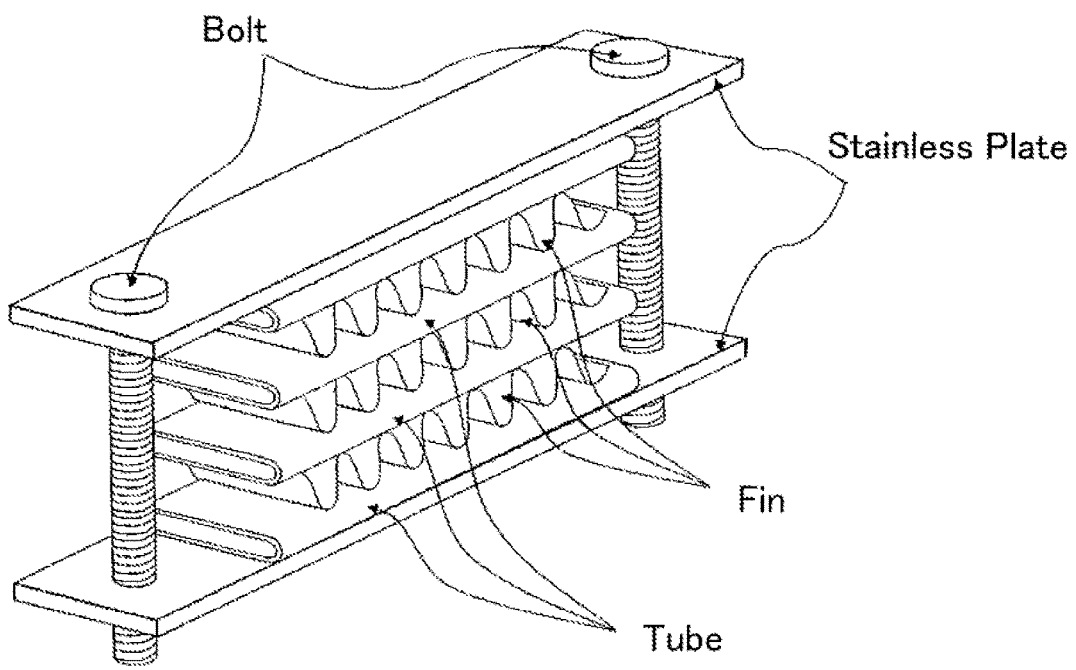
FIG. 4 is an external view of a three-stage laminated test piece (mini-core) used in first to third embodiments.
Figure 5:
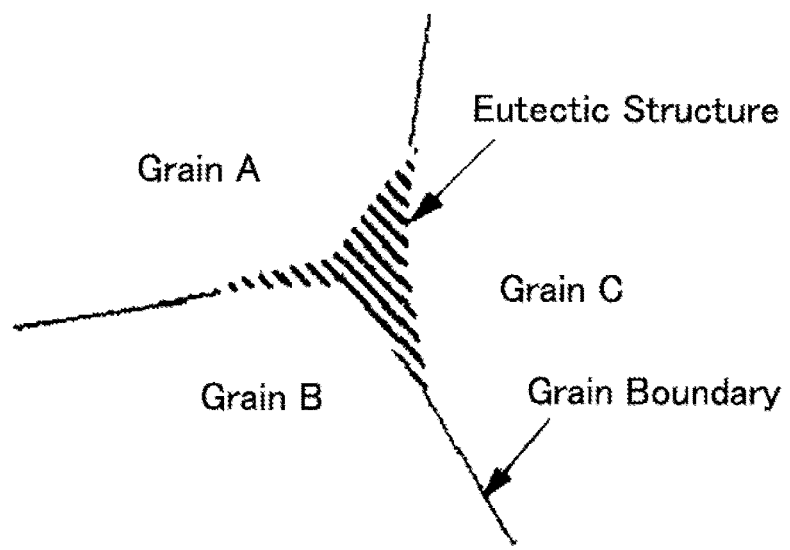
FIG. 5 is a diagram illustrating grain boundaries and a triple point thereof.
Figure 6:
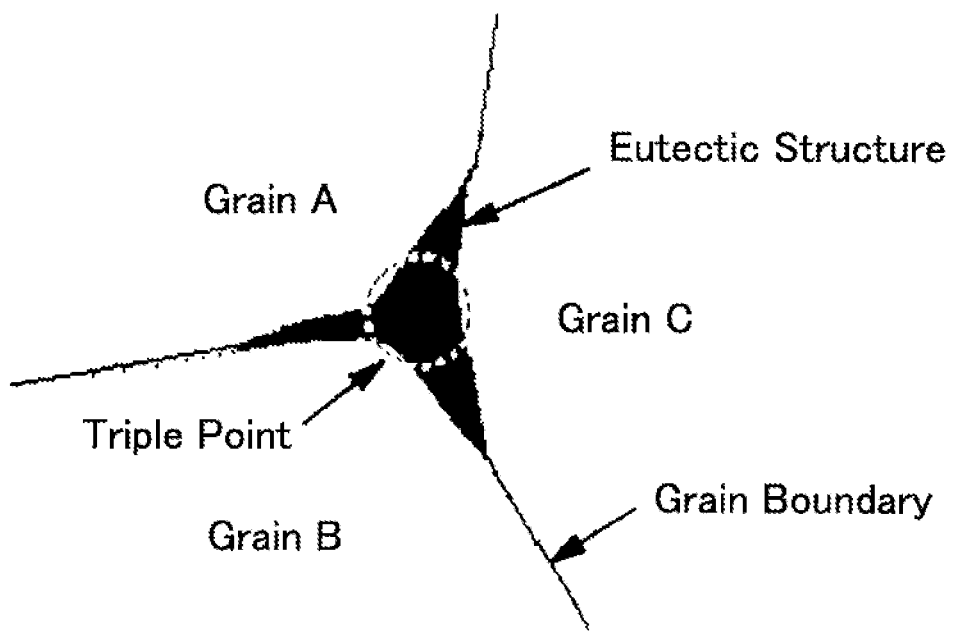
FIG. 6 is an explanatory view illustrating a method for discriminating the triple point of the grain boundaries.

Next, as illustrated in FIG. 4, each test plate was formed into a fin member having a width of 16 mm, a crest height of 7 mm, and a pitch of 2.5 mm. The fin member was combined with a tube member having a plate thickness of 0.4 mm, which was obtained by electrically welding a combined plate having the composition B1 in Table 2. A three-stage laminated test piece (mini-core), illustrated in FIG. 4, was fabricated by assembling the combination of the fin members and the tube members with the aid of a stainless jig.

The above-mentioned mini-core was dipped in a suspension solution containing 10% of non-corrosive fluoride-based flux. After drying, the mini-core was heated in a nitrogen atmosphere under conditions of the heating for the bonding, listed in Table 3, thereby bonding the fin and tube members to each other. For Inventive Example 16, the fin and tube members were bonded by heating them in vacuum without applying flux. Moreover, the retention time at each specified temperature during the bonding was set to 3 min. In the case of the mini-core mentioned above, because of the difference in coefficient of thermal expansion between the stainless jig and the aluminum material, a compression load of about 4N was generated between the stainless jig and the mini-core during the heating for the bonding. This implies that, with calculation based on a bonding area, stress of about 10 kPa is generated at the bonding interface between the fin and tube members.

After heating and bonding the fin and tube members to each other, the fin was peeled from the tube, and a rate (bonding rate) of completely-bonded portions was measured by examining 40 bonding portions between the tube and the fin of the mini-core. The measurement result was determined to be ⊚ (excellent) when the bonding rate was 90% or more, ○ (good) when it was 80% or more and less than 90%, Δ (fair) when it was 70% or more and less than 80%, and x (poor) when it was less than 70%.

A deformation rate attributable to fin buckling was also evaluated by measuring the fin height in the mini-core before and after the bonding. The deformation rate was determined to be ⊚ (excellent) when a rate of change in the fin height between before and after the bonding with respect to the fin height before the bonding was 5% or less, ○ (good) when it was more than 5% and 10% or less, Δ (fair) when it was more than 10% and 15% or less, and x (poor) when it was more than 15%.

The material structure of each sample after the heating for the bonding was also examined in the first embodiment. The study was conducted by embedding the mini-core after the bonding in a resin, grinding it, and by observing the structure in a cross-section of the member with an optical microscope. In more detail, grain sizes were first measured by observing a cross-section of the member, taken in the direction of plate thickness, after grinding and etching with the optical microscope. As a measurement method, a mean grain length was measured at a center in the direction of plate thickness in accordance with ASTME112-96.

Furthermore, the surface density of the eutectic structures within the grains, having lengths of 3 µm or more, was measured. The measurement was performed by grinding and etching a cross-section of the member, the cross-section being perpendicular to the direction of plate thickness, and by observing the structure in the cross-section of the member with the optical microscope. In addition, after grinding the cross-section of the member in a similar way, the cross-section was etched using the Keller's reagent, for example, and the positions of the intermetallic compounds were identified. Moreover, the grain boundaries in the relevant cross-section were made clear by the anodic oxidation method, and the positions of the triple points of the grain boundaries were identified. By comparing the positions of the intermetallic compounds and the positions of the triple points of the grain boundaries, a rate of the number of triple points of the grain boundaries where the intermetallic compounds having the equivalent circle diameters of 1 µm or more existed was determined with respect to the number of triple points of all the grain boundaries. For an unclear region, surface components of elements, such as Si, Fe and Mn were analyzed by employing the EPMA. As a result, portions where the Si composition was reduced in a linear form were identified as the grain boundaries, and portions where the compositions of other elements, such as Si and Fe, were high were identified as the intermetallic compounds. Among the number of triple points of all the grain boundaries, a rate of the number of triple points of the grain boundaries where the intermetallic compounds having the equivalent circle diameters of 1 µm or more existed was determined. The observation was made using a single-plate sample that was heated under the conditions of the heating for the bonding as those for the mini-core, and the measurement was performed for five observation fields at a magnification of 200.

Tables 3 and 4 list the respective evaluation results of the manufacturability, the surface density of the intermetallic compounds, the tensile strength, and the material structure after the heating for the bonding for each test piece, as well as the mini-core bonding test. Tables 3 and 4 further list equilibrium liquid phase rates under the bonding conditions (i.e., heating temperature) for each sample. The equilibrium liquid phase rate is a calculated value obtained by employing the equilibrium phase-diagram calculation software. It is to be noted that E+ in Tables 3 and 4 indicates exponential notation. For example, 1.2.E+03 implies $1.2 \times 10^3$.

TABLE 3

| | Composition No. | (a) | (b) | (c) | Heating Conditions for Bonding (d) | (e) | Tensile Strength (Mpa) Before Heating for Bonding T | $T_0$ | $T/T_0$ | (f) | (g) | (h) | (i) | Bonding Rate (%) | Deformation Rate |
|---|---|---|---|---|---|---|---|---|---|---|---|---|---|---|---|
| IE1 | A1 | ○ | 1.2.E+03 | 1.5.E+02 | 620 | 10 | 127 | 111 | 1.14 | 138 | 178 | 67 | 62 | 86 | ○ | ⊚ |
| IE2 | A2 | ○ | 2.3.E+03 | 2.2.E+02 | 610 | 13 | 135 | 117 | 1.15 | 140 | 155 | 72 | 73 | 89 | ○ | ⊚ |
| IE3 | A3 | ○ | 3.1.E+03 | 3.1.E+02 | 600 | 20 | 146 | 127 | 1.15 | 132 | 126 | 83 | 85 | 95 | ⊚ | ⊚ |
| IE4 | A4 | ○ | 4.2.E+03 | 3.5.E+02 | 600 | 27 | 150 | 130 | 1.15 | 123 | 117 | 89 | 96 | 99 | ⊚ | ○ |
| IE5 | A5 | ○ | 5.7.E+03 | 5.3.E+02 | 590 | 35 | 151 | 130 | 1.16 | 137 | 100 | 93 | 122 | 100 | ⊚ | Δ |
| IE6 | A6 | ○ | 2.4.E+03 | 1.4.E+02 | 600 | 14 | 140 | 122 | 1.15 | 136 | 291 | 76 | 84 | 91 | ⊚ | ⊚ |
| IE7 | A7 | ○ | 2.5.E+03 | 2.5.E+02 | 600 | 14 | 142 | 123 | 1.15 | 138 | 362 | 76 | 82 | 91 | ⊚ | ⊚ |
| IE8 | A8 | ○ | 2.3.E+03 | 2.9.E+02 | 600 | 12 | 150 | 128 | 1.17 | 155 | 95 | 73 | 94 | 90 | ⊚ | ⊚ |
| IE9 | A9 | ○ | 2.4.E+03 | 3.4.E+02 | 600 | 10 | 151 | 127 | 1.19 | 158 | 75 | 70 | 106 | 88 | ○ | ⊚ |
| IE10 | A10 | ○ | 3.5.E+03 | 1.1.E+02 | 600 | 17 | 120 | 92 | 1.31 | 122 | 189 | 77 | 323 | 92 | ⊚ | ⊚ |

TABLE 3-continued

| | Composition | | | | Heating Conditions for Bonding | | Tensile Strength (Mpa) Before Heating for Bonding | | | | | | | Bonding Rate | | Deformation |
| --- | --- | --- | --- | --- | --- | --- | --- | --- | --- | --- | --- | --- | --- | --- | --- | --- |
| | No. | (a) | (b) | (c) | (d) | (e) | T | $T_0$ | $T/T_0$ | (f) | (g) | (h) | (i) | (%) | | Rate |
| IE11 | A11 | ○ | 1.9.E+03 | 5.0.E+01 | 600 | 11 | 160 | 129 | 1.24 | 157 | 195 | 72 | 31 | 85 | ○ | ○ |
| IE12 | A12 | ○ | 1.7.E+03 | 2.0.E+01 | 600 | 6 | 170 | 130 | 1.31 | 168 | 213 | 54 | 15 | 79 | Δ | Δ |
| IE13 | A13 | ○ | 2.6.E+03 | 1.5.E+02 | 600 | 15 | 155 | 135 | 1.15 | 142 | 138 | 76 | 73 | 91 | ◎ | ◎ |
| IE14 | A14 | ○ | 2.5.E+03 | 1.6.E+02 | 600 | 23 | 220 | 168 | 1.31 | 174 | 141 | 83 | 154 | 95 | ◎ | ◎ |
| IE15 | A15 | ○ | 2.3.E+03 | 1.7.E+02 | 600 | 15 | 155 | 134 | 1.16 | 153 | 144 | 73 | 72 | 91 | ◎ | ◎ |
| IE16 | A16 | ○ | 2.7.E+02 | 1.6.E+02 | 600 | 6 | 225 | 173 | 1.30 | 235 | 174 | 42 | 80 | 73 | Δ | ◎ |
| IE17 | A30 | ○ | 2.5.E+03 | 1.6.E+02 | 600 | 14 | 141 | 123 | 1.15 | 144 | 145 | 74 | 81 | 92 | ◎ | ◎ |
| IE18 | A31 | ○ | 2.6.E+03 | 1.4.E+02 | 600 | 14 | 145 | 126 | 1.15 | 147 | 137 | 76 | 84 | 92 | ◎ | ◎ |
| IE19 | A32 | ○ | 2.7.E+03 | 1.4.E+02 | 600 | 14 | 165 | 140 | 1.18 | 162 | 144 | 82 | 78 | 91 | ◎ | ◎ |
| IE20 | A33 | ○ | 2.6.E+03 | 1.5.E+02 | 600 | 14 | 145 | 125 | 1.16 | 142 | 141 | 76 | 75 | 95 | ◎ | ◎ |
| IE21 | A34 | ○ | 2.5.E+03 | 1.6.E+02 | 600 | 14 | 150 | 128 | 1.17 | 147 | 140 | 72 | 70 | 94 | ◎ | ◎ |
| IE22 | A35 | ○ | 2.5.E+03 | 1.6.E+02 | 600 | 14 | 142 | 123 | 1.15 | 140 | 151 | 76 | 83 | 93 | ◎ | ◎ |
| IE23 | A36 | ○ | 2.4.E+03 | 1.8.E+02 | 600 | 14 | 144 | 124 | 1.16 | 148 | 152 | 75 | 81 | 96 | ◎ | ◎ |
| IE24 | A37 | ○ | 2.6.E+03 | 1.6.E+02 | 600 | 14 | 145 | 127 | 1.14 | 141 | 141 | 76 | 75 | 92 | ◎ | ◎ |
| IE25 | A38 | ○ | 2.7.E+03 | 1.7.E+02 | 600 | 14 | 152 | 135 | 1.13 | 149 | 144 | 76 | 74 | 91 | ◎ | ◎ |
| IE26 | A39 | ○ | 2.5.E+03 | 1.7.E+02 | 600 | 14 | 145 | 126 | 1.15 | 142 | 139 | 74 | 72 | 90 | ◎ | ◎ |
| IE27 | A40 | ○ | 2.4.E+03 | 1.5.E+02 | 600 | 14 | 153 | 131 | 1.17 | 143 | 147 | 76 | 82 | 90 | ◎ | ◎ |
| IE28 | A41 | ○ | 4.1.E+03 | 1.4.E+02 | 600 | 14 | 140 | 122 | 1.15 | 142 | 140 | 68 | 75 | 94 | ◎ | ◎ |
| IE29 | A42 | ○ | 9.2.E+03 | 1.7.E+02 | 600 | 14 | 142 | 123 | 1.15 | 144 | 149 | 76 | 78 | 97 | ◎ | ◎ |
| IE30 | A43 | ○ | 3.6.E+03 | 1.5.E+02 | 600 | 14 | 143 | 124 | 1.15 | 142 | 151 | 69 | 105 | 92 | ◎ | ◎ |
| IE31 | A44 | ○ | 7.8.E+03 | 1.4.E+02 | 600 | 14 | 140 | 122 | 1.15 | 140 | 138 | 77 | 112 | 92 | ◎ | ◎ |
| IE32 | A45 | ○ | 2.4.E+03 | 1.5.E+02 | 600 | 14 | 140 | 122 | 1.15 | 143 | 141 | 73 | 76 | 91 | ◎ | ◎ |
| IE33 | A46 | ○ | 2.6.E+03 | 1.6.E+02 | 600 | 14 | 139 | 121 | 1.15 | 141 | 144 | 76 | 85 | 90 | ◎ | ◎ |
| IE34 | A47 | ○ | 3.4.E+03 | 1.6.E+02 | 600 | 14 | 144 | 125 | 1.15 | 140 | 151 | 78 | 98 | 90 | ◎ | ◎ |
| IE35 | A48 | ○ | 9.3.E+03 | 1.7.E+02 | 600 | 14 | 140 | 122 | 1.15 | 143 | 141 | 75 | 106 | 92 | ◎ | ◎ |
| IE36 | A49 | ○ | 2.4.E+03 | 1.8.E+02 | 600 | 14 | 143 | 124 | 1.15 | 144 | 147 | 71 | 82 | 90 | ◎ | ◎ |
| IE37 | A50 | ○ | 2.7.E+03 | 1.5.E+02 | 600 | 14 | 140 | 122 | 1.15 | 140 | 146 | 76 | 77 | 91 | ◎ | ◎ |

IE: Inventive Example
(a) Manufacturability
(b) Surface Density of Si-based Intermetallic Compounds (number/mm$^2$)
(c) Surface Density of Al—Fe—Mn—Si-based Intermetallic Compounds (number/mm$^2$)
(d) Heating Temperature (° C.)
(e) Equilibrium Liquid Phase Rate (%)
(f) After Heating for Bonding
(g) Grain Size after Heating for Bonding (μm)
(h) Rate of Triple Points of Grain Boundaries where Intermetallic Compounds Exist (%)
(i) Surface Density of Eutectic Structures within Grains (number/mm$^2$)

TABLE 4

| | Composition | | | | Heating Conditions for Bonding | | Tensile Strength (Mpa) Before Heating for Bonding | | | | | | | Bonding Rate | | Deformation |
| --- | --- | --- | --- | --- | --- | --- | --- | --- | --- | --- | --- | --- | --- | --- | --- | --- |
| | No. | (a) | (b) | (c) | (d) | (e) | T | $T_0$ | $T/T_0$ | (f) | (g) | (h) | (i) | (%) | | Rate |
| CE1 | A51 | ○ | 2.2.E+02 | 2.2.E+02 | 620 | 2 | 120 | 106 | 1.13 | 118 | 141 | 40 | 8 | 14 | X | ◎ |
| CE2 | A52 | ○ | 7.2.E+04 | 1.2.E+03 | 580 | 36 | 155 | 134 | 1.16 | 121 | 29 | 93 | 3200 | 100 | ◎ | X |
| CE3 | A53 | ○ | 4.3.E+03 | 7.0.E+00 | 600 | 17 | 74 | 73 | 1.02 | 73 | 230 | 76 | 134 | 91 | ◎ | X |
| CE4 | A54 | ○ | 3.2.E+03 | 8.0.E+00 | 600 | 27 | 75 | 74 | 1.02 | 76 | 245 | 88 | 98 | 98 | ◎ | X |
| CE5 | A55 | X | — | — | — | — | — | — | — | — | — | — | — | — | — | — |
| CE6 | A56 | ○ | 1.8.E+03 | 9.0.E+00 | 600 | 11 | 78 | 76 | 1.02 | 78 | 124 | 79 | 9 | 83 | ○ | X |
| CE7 | A7 | ○ | 2.5.E+03 | 2.5.E+02 | 600 | 14 | 176 | 124 | 1.42 | 138 | 38 | 71 | 65 | 92 | ◎ | X |
| CE8 | A13 | ○ | 2.6.E+03 | 1.5.E+02 | 600 | 15 | 194 | 135 | 1.45 | 142 | 29 | 77 | 71 | 92 | ◎ | X |
| CE9 | A4 | ○ | 4.2.E+03 | 3.5.E+02 | 600 | 27 | 184 | 130 | 1.42 | 123 | 35 | 89 | 94 | 99 | ◎ | X |

CE: Comparative Example
(a) Manufacturability
(b) Surface Density of Si-based Intermetallic Compounds (number/mm$^2$)
(c) Surface Density of Al—Fe—Mn—Si-based Intermetallic Compounds (number/mm$^2$)
(d) Heating Temperature (° C.)
(e) Equilibrium Liquid Phase Rate (%)
(f) After Heating for Bonding
(g) Grain Size after Heating for Bonding (μm)
(h) Rate of Triple Points of Grain Boundaries where Intermetallic Compounds Exist (%)
(i) Surface Density of Eutectic Structures within Grains (number/mm$^2$)

As seen from Tables 3 and 4, the manufacturability was acceptable in the samples that satisfied the conditions specified in the present invention with regard to the composition of the aluminum alloy material and the heating conditions. On the other hand, in the rolling of the sample having the alloy composition A55, the relevant sample could not be rolled up to the final plate thickness because Fe exceeded the specified amount and giant intermetallic compounds were generated during the casing.

Comparing, as for the results of the bonding tests, the evaluation results of the individual mini-core samples with the compositions (Tables 1 and 2) of the aluminum alloy materials of the fin members, the bonding rate, the fin buckling, and the tensile length were all acceptable in the samples (Inventive Examples 1-37), which satisfied the conditions specified in the present invention with regard to the composition of the aluminum alloy material and the heating conditions. For Inventive Examples 15-27 that were samples made of alloys containing, as additive elements, Mg, Ni, Ti, V, Zr and Cr in addition to Si, Fe, Mn as essential elements, it was confirmed that the evaluation results of the deformation rate was more satisfactory, and that those elements had the effect of increasing the strength.

On the other hand, in Comparative Example 1, because the Si component did not reach the specified amount and the surface density of the Si-based intermetallic compounds in the material plate also did not reach the specified value, the liquid phase generation rate was as low as less than 5% even with the heating temperature set to be relatively high. Hence the bonding rate was reduced and the bonding performance was inferior.

In Comparative Example 2, because the Si component exceeded the specified amount and the surface density of the Al—Fe—Mn—Si-based intermetallic compounds in the material plate also exceeded the specified value, the liquid phase rate during the bonding was increased even with the heating temperature set to be relatively low. Moreover, the grain sizes after the heating were small. Hence the fin was buckled and the deformation rate was unacceptable.

In Comparative Example 3, because the Fe component did not reach the specified amount and the surface density of the Al—Fe—Mn—Si-based intermetallic compounds in the material plate also did not reach the specified value, the strengths before and after the heating were low and unacceptable. Moreover, the fin was buckled and the deformation rate was also unacceptable.

In Comparative Example 4, because the Mn component did not reach the specified amount and the surface density of the Al—Fe—Mn—Si-based intermetallic compounds in the material plate also did not reach the specified value, the strengths before and after the heating were low and unacceptable. Moreover, the fin was buckled and the deformation rate was also unacceptable.

In Comparative Example 5, because the Fe component exceeded the specified amount, a problem occurred in the manufacturability, and the evaluation by the bonding test could not be performed.

In Comparative Example 6, because the Mn component exceeded the specified amount and the surface density of the Al—Fe—Mn—Si-based intermetallic compounds in the material plate did not reach the specified value, the strengths before and after the heating were low and unacceptable. Moreover, the fin was buckled and the deformation rate was also unacceptable.

In Comparative Examples 7 to 9, because the reduction ratio in the final cold rolling stage was larger and T/To exceeded the specified value, grains became too finer during the heating for the bonding, and the deformation rate was unacceptable.

Second Embodiment

In a second embodiment, influences of the heating temperature as one of the bonding conditions were examined. The material plates manufactured in the first embodiment were optionally selected as listed in Table 3 and were formed into fins similar to those in the first embodiment. Furthermore, as in the first embodiment, three-stage laminated test pieces (mini-cores) were fabricated (FIG. 4). The mini-cores were each dipped in a suspension solution containing 10% of non-corrosive fluoride-based flux. After drying, the mini-cores were heated to various heating temperatures and held there for predetermined times, listed in Table 3, in a nitrogen atmosphere, thereby bonding the fin and tube members to each other.

The bonding rate and the deformation rate attributable to fin buckling were evaluated in the same way as in the first embodiment by measuring the bonding rate and the dimensional change after the bonding. Moreover, as in the first embodiment, the structure in a cross-section of each member was observed to determine the surface density of the intermetallic compounds, the grain sizes after the heating for the bonding, the surface density of the eutectic structures having lengths of 3 μm or more within the grains, and the rate of the number of triple points of the grain boundaries where the intermetallic compounds having the equivalent circle diameters of 1 μm or more existed with respect to the number of triple points of all the grain boundaries. The evaluation results are listed in Table 5. It is to be noted that in Table 5, for example, 3.1E+03 implies $3.1 \times 10^3$.

TABLE 5

| | Composition | | | Heating Conditions for Bonding | | | | | | | Bonding | | |
| | | | | | | Retention | | | | | Rate | Deformation |
| | No. | (b) | (c) | (d) | (e) | Time (sec) | (j) | (k) | (h) | (i) | (%) | | Rate |
|---|---|---|---|---|---|---|---|---|---|---|---|---|---|
| IE38 | A3 | 3.1E+03 | 3.1E+02 | 590 | 16 | 180 | 576 | 271 | 81 | 79 | 94 | ◎ | ◎ |
| IE39 | A3 | 3.1E+03 | 3.1E+02 | 610 | 27 | 180 | 576 | 401 | 91 | 105 | 99 | ◎ | ○ |
| IE40 | A22 | 2.5E+03 | 2.4E+02 | 600 | 16 | 180 | 576 | 336 | 81 | 85 | 94 | ◎ | ◎ |
| IE41 | A22 | 2.5E+03 | 2.4E+02 | 620 | 33 | 180 | 576 | 466 | 93 | 116 | 100 | ◎ | Δ |
| IE42 | A17 | 2.6E+03 | 2.5E+02 | 600 | 15 | 180 | 574 | 349 | 80 | 88 | 93 | ◎ | ◎ |
| IE43 | A17 | 2.6E+03 | 2.5E+02 | 620 | 30 | 180 | 574 | 479 | 93 | 124 | 100 | ◎ | ○ |
| IE44 | A2 | 2.3E+03 | 2.2E+02 | 600 | 8 | 180 | 591 | 239 | 70 | 65 | 88 | ○ | ◎ |
| IE45 | A3 | 3.1E+03 | 3.1E+02 | 580 | 12 | 20 | 576 | 65 | 77 | 66 | 92 | ◎ | ◎ |
| IE46 | A3 | 3.1E+03 | 3.1E+02 | 590 | 16 | 3300 | 576 | 3391 | 81 | 82 | 94 | ◎ | Δ |

TABLE 5-continued

| | Composition | Heating Conditions for Bonding | | | | | | | | Bonding | | Deformation |
| | | | | | | Retention | | | | | Rate | |
| | No. | (b) | (c) | (d) | (e) | Time (sec) | (j) | (k) | (h) | (i) | (%) | Rate |
| --- | --- | --- | --- | --- | --- | --- | --- | --- | --- | --- | --- | --- |
| RE1 | A4 | 4.2E+03 | 3.5E+02 | 620 | 47 | 180 | 576 | 466 | 93 | 245 | 100 ⊚ | X |
| RE2 | A2 | 2.3E+03 | 2.2E+02 | 580 | 2 | 180 | 591 | 109 | 35 | 8 | 32 X | ⊚ |
| RE3 | A3 | 3.1E+03 | 3.1E+02 | 620 | 38 | 180 | 576 | 466 | 93 | 289 | 100 ⊚ | X |
| RE4 | A3 | 3.1E+03 | 3.1E+02 | 590 | 16 | 5 | 576 | 25 | 46 | 55 | 75 Δ | ⊚ |
| RE5 | A3 | 3.1E+03 | 3.1E+02 | 610 | 27 | 3700 | 576 | 3921 | 91 | 312 | 99 ⊚ | X |

IE: Inventive Example
RE: Reference Example
(b) Surface Density of Si-based Intermetallic Compounds (number/mm$^2$)
(c) Surface Density of Al—Fe—Mn—Si-based Intermetallic Compounds (number/mm$^2$)
(d) Heating Temperature (° C.)
(e) Equilibrium Liquid Phase Rate (%)
(h) Rate of Triple Points of Grain Boundaries where Intermetallic Compounds Exist (%)
(i) Surface Density of Eutectic Structures within Grains (number/mm$^2$)
(j) Temperature at which Liquid Phase Rate is 5% (° C.)
(k) Time during which Liquid Phase Rate is 5% or more (sec)

As described above, when bonding the aluminum alloy material according to the present invention, it is preferable that the heating temperature is set to temperature at which the liquid phase rate is 5 to 30%, and the time during which the liquid phase rate is 5% or more is 30 sec or longer and 3600 sec or shorter. As seen from Table 3, in Inventive Examples 38-46, those conditions are all satisfied, and the bonding rate and the deformation rate were both acceptable.

On the other hand, in Reference Examples 1 and 3, because the heating temperature was high and the liquid phase rate was too high, the shape could not be maintained, thus causing large deformation. In Reference Example 2, because the heating temperature was low and the liquid phase rate was also low, the bonding was insufficient.

In Reference Example 4, because the retention time during which the liquid phase rate was 5% or more was short, the bonding rate was insufficient. In Reference Example 5, because the retention time during which the liquid phase rate was 5% or more was too long, large deformation occurred.

Third Embodiment

In a third embodiment, influences of additive elements upon corrosion resistance were examined. The material plates manufactured in the first embodiment were optionally selected as listed in Table 6 and were formed into fins similar to those in the first embodiment. Furthermore, as in the first embodiment, three-stage laminated test pieces (mini-cores) were fabricated (FIG. 4). The mini-cores were each dipped in a suspension solution containing 10% of non-corrosive fluoride-based flux. After drying, the mini-cores were heated to various heating temperatures and held there for predetermined times, listed in Table 3, in a nitrogen atmosphere, thereby bonding the fins and the tubes to each other.

The bonding rate and the deformation rate were evaluated in the same way as in the first embodiment by measuring the bonding rate and the dimensional change after the bonding. Moreover, as in the first embodiment, the structure in a cross-section of each member was observed to determine the surface density of the intermetallic compounds, the surface density of the eutectic structures having lengths of 3 μm or more within the grains, and the rate of the number of triple points of the grain boundaries where the intermetallic compounds having the equivalent circle diameters of 1 μm or more existed with respect to the number of triple points of all the grain boundaries.

In addition, for evaluation of corrosion resistance of the fin itself, the CASS test was conducted for 500 h, and a corrosion state of the fin was confirmed. By observing a cross-section of the fin with an optical microscope, the corrosion state was determined to be ⊚ (excellent) when a rate of the remaining fin was 70% or more, ◯ (good) when it was 50% or more and less than 70%, Δ (fair) when it was 30% or more and less than 50%, and x (poor) when it was less than 30%. The evaluation results are listed in Table 6. It is to be noted that in Table 6, for example, 2.3.E+03 implies 2.3×10$^3$.

TABLE 6

| | Composition | | Heating Conditions for Bonding | | | | | | Bonding Rate | | Deformation Rate | Corrosion Resistance |
| | No. | (b) | (c) | (d) | (e) | (h) | (i) | (%) | | | |
| --- | --- | --- | --- | --- | --- | --- | --- | --- | --- | --- | --- |
| IE47 | A2 | 2.3.E+03 | 2.2.E+02 | 610 | 13 | 72 | 73 | 91 | ⊚ | ⊚ | Δ |
| IE48 | A17 | 2.5.E+03 | 2.4.E+02 | 600 | 15 | 73 | 72 | 91 | ⊚ | ⊚ | ◯ |
| IE49 | A18 | 2.6.E+03 | 2.5.E+02 | 600 | 6 | 42 | 80 | 73 | Δ | ⊚ | ◯ |
| IE50 | A19 | 2.6.E+03 | 2.6.E+02 | 600 | 14 | 76 | 82 | 92 | ⊚ | ⊚ | ◯ |
| IE51 | A20 | 2.5.E+03 | 2.4.E+02 | 600 | 14 | 82 | 84 | 92 | ⊚ | ⊚ | ⊚ |
| IE52 | A21 | 2.7.E+03 | 2.4.E+02 | 600 | 15 | 85 | 93 | 92 | ⊚ | ⊚ | ⊚ |
| IE53 | A22 | 2.4.E+03 | 2.5.E+02 | 600 | 16 | 92 | 113 | 92 | ⊚ | ⊚ | ◯ |
| IE54 | A23 | 2.5.E+03 | 2.5.E+02 | 600 | 24 | 93 | 122 | 100 | ⊚ | ⊚ | ◯ |

TABLE 6-continued

| Composition | | Heating Conditions for Bonding | | | | Bonding Rate | Deformation | Corrosion |
| --- | --- | --- | --- | --- | --- | --- | --- | --- |
| No. | (b) | (c) | (d) | (e) | (h) | (i) | (%) | Rate | Resistance |
| IE55 | A24 | 2.6.E+03 | 2.6.E+02 | 600 | 26 | 93 | 145 | 100 | ◉ | ◯ | ◉ |
| IE56 | A25 | 2.6.E+03 | 2.4.E+02 | 600 | 24 | 92 | 126 | 98 | ◉ | ◯ | ◉ |
| IE57 | A26 | 2.7.E+03 | 2.5.E+02 | 600 | 24 | 93 | 122 | 100 | ◉ | ◯ | ◯ |
| IE58 | A27 | 2.4.E+03 | 2.5.E+02 | 600 | 24 | 90 | 134 | 96 | ◉ | ◯ | ◯ |
| IE59 | A28 | 2.5.E+03 | 2.4.E+02 | 600 | 14 | 83 | 85 | 93 | ◉ | ◯ | ◯ |
| IE60 | A29 | 2.4.E+03 | 2.4.E+02 | 600 | 14 | 78 | 89 | 92 | ◉ | ◯ | ◯ |

IE: Inventive Example
(b) Surface Density of Si-based Intermetallic Compounds (number/mm$^2$)
(c) Surface Density of Al—Fe—Mn—Si-based Intermetallic Compounds (number/mm$^2$)
(d) Heating Temperature (° C.)
(e) Equilibrium Liquid Phase Rate (%)
(h) Rate of Triple Points of Grain Boundaries where Intermetallic Compounds Exist (%)
(i) Surface Density of Eutectic Structures within Grains (number/mm$^2$)

In Inventive Examples 48 to 60 according to the third embodiment, aluminum alloys containing, as additive elements, Cu, Zn, In, Sn, Ti and V in addition to the essential elements, i.e., Si, Fe and Mn, were used as samples. In those Inventive Examples, as seen from Table 6, the corrosion resistance was improved in comparison with that of an alloy used in Inventive Example 47 not containing Zn, etc. Thus, usefulness of the above-mentioned additive elements was confirmed.

Fourth Embodiment

In a fourth embodiment, influences of changes in distribution of the intermetallic compounds in the aluminum alloy material upon the bonding performance due to the manufacturing process were examined. The material plates manufactured in the first embodiment were optionally selected as listed in Table 7 and were formed into fins similar to those in the first embodiment under manufacturing conditions listed in Table 7. Furthermore, as in the first embodiment, three-stage laminated test pieces (mini-cores) were fabricated (FIG. 4). The mini-cores were each dipped in a suspension solution containing 10% of non-corrosive fluoride-based flux. After drying, the mini-cores were heated to 600° C. and held there for a holding time of 3 min in a nitrogen atmosphere, thereby bonding the fins and the tubes to each other. The manufacturability was also evaluated as in the first embodiment (Table 7).

TABLE 7

| | | | Manufacturing Process | | | | | |
| --- | --- | --- | --- | --- | --- | --- | --- | --- |
| Composition No. | (a) | Casting Speed (mm/min) | Slab Thickness after Facing (mm) | (l) | (m) | (n) | (o) | (p) |
| IE61 | A3 | ◯ | 40 | 400 | 25 | 94 | 5 | 480 | 5 |
| IE62 | A3 | ◯ | 30 | 400 | 25 | 94 | 5 | 480 | 5 |
| IE63 | A3 | ◯ | 25 | 400 | 25 | 94 | 5 | 480 | 5 |
| IE64 | A3 | ◯ | 80 | 400 | 25 | 94 | 5 | 480 | 5 |
| IE65 | A3 | ◯ | 90 | 400 | 25 | 94 | 5 | 480 | 5 |
| IE66 | A3 | ◯ | 40 | 400 | 32 | 92 | 5 | 480 | 5 |
| IE67 | A3 | ◯ | 40 | 600 | 18 | 97 | 5 | 480 | 5 |
| IE68 | A3 | ◯ | 40 | 400 | 25 | 94 | 3 | 480 | 5 |
| IE69 | A3 | ◯ | 40 | 400 | 25 | 94 | 4 | 480 | 5 |
| IE70 | A3 | ◯ | 40 | 400 | 25 | 94 | 8 | 480 | 5 |
| IE71 | A3 | ◯ | 40 | 400 | 25 | 94 | 5 | 440 | 5 |

TABLE 7-continued

| | | | Manufacturing Process | | | | | |
| --- | --- | --- | --- | --- | --- | --- | --- | --- |
| Composition No. | (a) | Casting Speed (mm/min) | Slab Thickness after Facing (mm) | (l) | (m) | (n) | (o) | (p) |
| IE72 | A3 | ◯ | 40 | 400 | 25 | 94 | 5 | 480 | 0 |
| IE73 | A3 | ◯ | 40 | 400 | 25 | 94 | 5 | 480 | 13 |
| IE74 | A3 | ◯ | 40 | 400 | 25 | 94 | 5 | 520 | 5 |
| CE10 | A3 | ◯ | 15 | 400 | 25 | 94 | 5 | 480 | 5 |
| CE11 | A3 | X | 120 | 400 | 25 | 94 | 5 | 480 | 5 |
| CE12 | A3 | ◯ | 40 | 600 | 60 | 90 | 5 | 480 | 5 |
| CE13 | A3 | ◯ | 40 | 750 | 15 | 98 | 5 | 480 | 5 |
| CE14 | A3 | ◯ | 40 | 400 | 25 | 94 | 2 | 480 | 5 |

IE: Inventive Example
CE: Comparative Example
(a) Manufacturability
(l) Plate Thickness after Hot Rough Rolling Stage (mm)
(m) Total Reduction ratio in Hot Rough Rolling Stage (%)
(n) Number of Passes in which Reduction ratio is 15% or more in Hot Rough Rolling Stage (number)
(o) Heating Retention Temperature before Hot Rolling (° C.)
(p) Heating Retention Time before Hot Rolling (hour)

The bonding rate and the deformation rate attributable to fin buckling were evaluated in the same way as in the first embodiment by measuring the bonding rate and the dimensional change after the bonding. Moreover, as in the first embodiment, the structure in a cross-section of each member was observed to determine the surface density of the intermetallic compounds, the grain sizes after the heating for the bonding, the surface density of the eutectic structures having lengths of 3 μm or more within the grains, and the rate of the number of triple points of the grain boundaries where the intermetallic compounds having the equivalent circle diameters of 1 μm or more existed with respect to the number of triple points of all the grain boundaries. The evaluation results are listed in Table 8. Table 8 further list the results of measuring, in relation to the measurement of the surface density of the intermetallic compounds before the heating for the bonding, not only respective surface densities of the Si-based intermetallic compounds having the equivalent circle diameters of 0.5 μm to 5 μm and the Al—Fe—Mn—Si-based intermetallic compounds having the equivalent circle diameters of 5 μm or more, but also the Si-based intermetallic compounds having the equivalent circle diameters of 5 μm or more and the Al—Fe—Mn—Si-based intermetallic compounds having the equivalent circle diameters of 0.5 μm or more and 5 μm or less and of 10 μm or more. It is to be noted that in Table 8, for example, 3.1.E+03 implies $3.1 \times 10^3$.

TABLE 8

| | Composition No. | (b) 0.5 μm ≤ Equivalent circle diameters ≤5 μm (number/mm²) | Equivalent circle diameters >5 μm (number/mm²) | (c) 0.5 μm ≤ Equivalent circle diameters ≤5 μm (number/mm²) | Equivalent circle diameters >5 μm (number/mm²) | Equivalent circle diameters ≥10 μm (number/mm²) | (g) | (h) | (i) | Bonding Rate (%) | | Deformation Rate |
|---|---|---|---|---|---|---|---|---|---|---|---|---|
| IE61 | A3 | 3.1.E+03 | 0.0.E+00 | 7.5.E+03 | 3.1.E+02 | 0.0.E+00 | 126 | 83 | 85 | 95 | ⊚ | ⊚ |
| IE62 | A3 | 7.2.E+02 | 0.0.E+00 | 5.7.E+03 | 6.5.E+02 | 0.0.E+00 | 102 | 78 | 84 | 80 | ○ | ○ |
| IE63 | A3 | 3.8.E+02 | 0.0.E+00 | 4.7.E+03 | 8.8.E+02 | 0.0.E+00 | 91 | 79 | 83 | 73 | Δ | Δ |
| IE64 | A3 | 5.5.E+03 | 0.0.E+00 | 1.5.E+04 | 4.2.E+01 | 0.0.E+00 | 183 | 81 | 84 | 98 | ⊚ | ⊚ |
| IE65 | A3 | 6.2.E+03 | 0.0.E+00 | 1.7.E+04 | 3.3.E+01 | 0.0.E+00 | 205 | 80 | 84 | 99 | ⊚ | ⊚ |
| IE66 | A3 | 2.6.E+03 | 0.0.E+00 | 7.5.E+03 | 8.4.E+02 | 0.0.E+00 | 118 | 79 | 83 | 92 | ⊚ | Δ |
| IE67 | A3 | 4.6.E+03 | 0.0.E+00 | 7.5.E+03 | 2.2.E+02 | 0.0.E+00 | 164 | 80 | 85 | 96 | ⊚ | ⊚ |
| IE68 | A3 | 2.2.E+03 | 0.0.E+00 | 7.5.E+03 | 6.8.E+02 | 0.0.E+00 | 106 | 79 | 85 | 90 | ⊚ | ○ |
| IE69 | A3 | 2.7.E+03 | 0.0.E+00 | 7.5.E+03 | 4.9.E+02 | 0.0.E+00 | 118 | 78 | 83 | 93 | ⊚ | ⊚ |
| IE70 | A3 | 4.3.E+03 | 0.0.E+00 | 7.5.E+03 | 1.9.E+02 | 0.0.E+00 | 152 | 82 | 84 | 97 | ⊚ | ⊚ |
| IE71 | A3 | 3.2.E+03 | 0.0.E+00 | 7.5.E+03 | 2.7.E+02 | 0.0.E+00 | 90 | 80 | 85 | 94 | ⊚ | ○ |
| IE72 | A3 | 3.3.E+03 | 0.0.E+00 | 7.5.E+03 | 2.9.E+02 | 0.0.E+00 | 101 | 81 | 83 | 92 | ⊚ | ○ |
| IE73 | A3 | 3.1.E+03 | 0.0.E+00 | 7.5.E+03 | 6.8.E+02 | 0.0.E+00 | 109 | 81 | 83 | 93 | ⊚ | ○ |
| IE74 | A3 | 3.4.E+03 | 0.0.E+00 | 7.5.E+03 | 8.7.E+02 | 0.0.E+00 | 92 | 82 | 84 | 93 | ⊚ | ○ |
| CE10 | A3 | 2.3.E+02 | 0.0.E+00 | 2.8.E+03 | 1.2.E+03 | 0.0.E+00 | 46 | 82 | 83 | 62 | X | X |
| CE11 | A3 | — | — | — | — | — | — | — | — | — | — | — |
| CE12 | A3 | 2.4.E+02 | 0.0.E+00 | 7.5.E+03 | 1.1.E+03 | 0.0.E+00 | 48 | 80 | 84 | 65 | X | X |
| CE13 | A3 | 2.3.E+02 | 0.0.E+00 | 7.5.E+03 | 1.3.E+03 | 0.0.E+00 | 45 | 78 | 85 | 60 | X | X |
| CE14 | A3 | 4.7.E+02 | 0.0.E+00 | 7.5.E+03 | 1.1.E+03 | 0.0.E+00 | 47 | 81 | 83 | 74 | Δ | X |

IE: Inventive Example
CE: comparative Example
(b) Surface Density of Si-based Intermetallic Compounds
(c) Surface Density of Al—Fe—Mn—Si-based Intermetallic Compounds
(g) Grain Size after Heating for Bonding (μM)
(h) Rate of Triple Points of Grain Boundaries where Intermetallic Compounds Exist (%)
(i) Surface Density of Eutectic Structures within Grains (number/mm²)

In samples (Inventive Examples 61 to 74) manufactured according to the method of the present invention, the bonding rate and the deformation rate were both acceptable.

On the other hand, in Comparative Example 10, because the casting speed was too low, the surface density of the Si-based intermetallic compounds in the material plate did not reach the specified value and the surface density of the Al—Fe—Mn—Si-based intermetallic compounds in the material plate exceeded the specified value. Thus, due to coarsening of the Si-based intermetallic compounds and the Al—Fe—Mn—Si-based intermetallic compounds, the grain sizes after the heating were reduced, whereby the fin was buckled and the deformation rate was unacceptable. Moreover, because the amount of the Si-based intermetallic compounds satisfying the specified surface density was reduced, the bonding rate was unacceptable.

In Comparative Example 11, because the casting speed was too high, cracking occurred during the manufacturing of the ingot, and the sample plate could not be manufactured.

In Comparative Example 12, the total reduction ratio in the hot rough rolling stage was less than the specified value, and the Si-based intermetallic compounds and the Al—Fe—Mn—Si-based intermetallic compounds in the material plate were not sufficiently made finer. Thus, the surface density of the Si-based intermetallic compounds in the material plate did not reach the specified value, and the bonding rate was unacceptable. In addition, because the surface density of the Al—Fe—Mn—Si-based intermetallic compounds in the material plate exceeded the specified value, the grain sizes after the heating were reduced due to coarsening of the intermetallic compounds. As a result, the fin was buckled and the deformation rate was unacceptable.

In Comparative Example 13, because the slab thickness after the facing was too large, the total reduction ratio in the hot rough rolling stage was more than the specified value. Because the ingot thickness was too large, the cooling rate during the manufacturing of the ingot was reduced, and coarse precipitated deposits were generated. The coarse precipitated deposits were not sufficiently fragmented in the hot rough rolling stage, whereby the surface density of the Si-based intermetallic compounds in the material plate did not reach the specified value and the surface density of the Al—Fe—Mn—Si-based intermetallic compounds in the material plate exceeded the specified value. The grain sizes after the heating were reduced due to coarsening of the intermetallic compounds. As a result, the fin was buckled and the deformation rate was unacceptable. Because the surface density of the Si-based intermetallic compounds in the material plate did not reach the specified value, the bonding rate was low and unacceptable.

In Comparative Example 14, the number of passes in each of which the reduction ratio was 15% or more was less than three in the hot rough rolling stage. Therefore, the Al—Fe—Mn—Si-based intermetallic compounds were not sufficiently made finer, and the surface density of those intermetallic compounds exceeded the specified value. Liquid phases were generated around the coarse Al—Fe—Mn—Si-based intermetallic compounds, and a rate of liquid phase pools occupying in the plate thickness was increased. As a result, the fin was buckled and the deformation rate was unacceptable.

INDUSTRIAL APPLICABILITY

The aluminum alloy material according to the present invention is useful as the fin member of the heat exchanger, and it can be bonded to another constituent member of the heat exchanger, including another fin member, without using a bonding material, such as a brazing filler metal or a welding material. Therefore, the heat exchanger can be efficiently manufactured. Changes in size and shape hardly occur during the bonding of the aluminum alloy material. Thus, the aluminum alloy material and the bonding method using the aluminum alloy material, according to the present invention, are remarkably effective from the industrial point of view.

The invention claimed is:

1. An aluminum alloy material for a heat exchanger fin, having a superior bonding function under heating of a single layer of the aluminum alloy material and containing Si in an amount from about 2.0% to ≤5.0% by mass, Fe: 0.1 to 2.0% by mass, and Mn: 0.1 to 2.0% by mass with balance being Al and inevitable impurities;
wherein 250 pieces/mm$^2$ or more to $7\times10^4$ pieces/mm$^2$ or less of Si-based intermetallic compound particles having equivalent circle diameters of 0.5 to 5 μm are present in a cross-section of the aluminum alloy material; and
wherein 10 pieces/mm$^2$ or more and 1000 pieces/mm$^2$ or less of the Al—Fe—Mn—Si-based intermetallic compounds having equivalent circle diameters of more than 5 μm are present in a cross-section of the aluminum alloy material.

2. The aluminum alloy material for the heat exchanger fin according to claim 1, wherein the aluminum alloy material is configured to satisfy T/To≤1.40 where T denotes tensile strength of a material plate, and To denotes tensile strength after heating at 450° C. for 2 hours.

3. The aluminum alloy material for the heat exchanger fin according to claim 1, further containing one or two selected from Mg: 2.0% by mass or less and Cu: 1.5% by mass or less.

4. The aluminum alloy material for the heat exchanger fin according to claim 1, further containing one or two or more selected from among Zn: 6.0% by mass or less, In: 0.3% by mass or less, and Sn: 0.3% by mass or less.

5. The aluminum alloy material for the heat exchanger fin according to claim 1, further containing one or more selected from among Ti: 0.3% by mass or less, V: 0.3% by mass or less, Zr: 0.3% by mass or less, Cr: 0.3% by mass or less, and Ni: 2.0% by mass or less.

6. The aluminum alloy material for the heat exchanger fin according to claim 1, further containing one or two or more selected from among Be: 0.1% by mass or less, Sr: 0.1% by mass or less, Bi: 0.1% by mass or less, Na: 0.1% by mass or less, and Ca: 0.05% by mass or less.

7. The aluminum alloy material for the heat exchanger fin according to claim 1, wherein tensile strength of the aluminum alloy material before heating for bonding is 80 to 250 MPa.

8. A heat exchanger manufactured by heating and bonding a fin member, which is made of the aluminum alloy material according to claim 1, and another constituent member of the heat exchanger together.

9. The heat exchanger according to claim 8, wherein the aluminum alloy material for the fin member has, after the heating for bonding, a microstructure in which the grain size of an aluminum matrix is 50 μm or more, in a cross-section of the fin member.

10. The heat exchanger according to claim 8, wherein, in the microstructure in a cross-section of the aluminum alloy material for the fin member after the heating for bonding, the number of triple points of grain boundaries, where intermetallic compounds having equivalent circle diameters of 1 μm or more exist, is 50% or more of the total number of triple points of all the grain boundaries.

11. The heat exchanger according to claim 8, wherein the microstructure in a cross-section of the aluminum alloy material for the fin member after the heating for bonding has 10 pieces/mm$^2$ to 3000 pieces/mm$^2$ of eutectic structures having lengths of 3 μm or more within matrix grains.

12. A method of manufacturing the aluminum alloy material for the heat exchanger fin according to claim 1, the method comprising a casting step of casting an aluminum alloy for the aluminum alloy material, a heating step of heating a cast ingot before hot rolling, a hot rolling step of hot-rolling the ingot after the heating step, a cold rolling step of cold-rolling a hot-rolled plate, and an annealing step of annealing a cold-rolled plate midway the cold rolling step;
wherein a casting speed is set to be 20 to 100 mm/min in the casting step; and
wherein while the hot rolling step includes a rough rolling stage and a finish rolling stage, a total reduction ratio in the rough rolling stage is set to be 92 to 97%, the rough rolling stage including three or more passes in each of which a reduction ratio is 15% or more.

* * * * *